United States Patent [19]
Brett et al.

[11] Patent Number: 5,131,478
[45] Date of Patent: Jul. 21, 1992

[54] LOW FRICTION SUBTERRANEAN DRILL BIT AND RELATED METHODS

[76] Inventors: J. Ford Brett, 2511 S. Terwilleger, Tulsa, Okla. 74114; Tommy M. Warren, Rte. 1, Coweta, Okla. 74429; L. Allen Sinor, 2250 S. Oswego Pl., Tulsa, Okla. 74114; Suzanne M. Behr, 2419 E. 55th Pl., #30, Tulsa, Okla. 74105

[21] Appl. No.: 550,785

[22] Filed: Jul. 10, 1990

Related U.S. Application Data

[63] Continuation-in-part of Ser. No. 313,126, Feb. 21, 1989, abandoned.

[51] Int. Cl.$^5$ .................. E21B 7/10; E21B 10/00; E21B 10/46
[52] U.S. Cl. .................. 175/57; 175/399; 175/408; 175/431
[58] Field of Search ............... 175/398, 399, 376, 409, 175/410, 413, 57, 406, 408

[56] References Cited

U.S. PATENT DOCUMENTS

| | | | |
|---|---|---|---|
| 1,463,566 | 7/1923 | Akins | 175/389 |
| 3,163,243 | 12/1964 | Clearly | 175/399 |
| 3,629,558 | 12/1971 | Coggin | 235/151.1 |
| 3,751,177 | 8/1973 | Faber | 175/408 X |
| 3,851,719 | 12/1974 | Thompson et al. | 175/406 |
| 3,966,349 | 6/1976 | Osman et al. | 408/204 |
| 4,545,441 | 10/1985 | Williamson | 175/329 |
| 4,549,614 | 10/1985 | Kaalstad et al. | 175/339 |
| 4,641,718 | 2/1987 | Bengtsson | 175/331 |
| 4,753,305 | 6/1988 | Fisher | 175/410 |
| 4,790,397 | 12/1988 | Kaalstad et al. | 175/376 X |
| 4,815,342 | 3/1989 | Brett et al. | 76/108.2 |
| 5,042,596 | 8/1991 | Brett et al. | 175/57 |

OTHER PUBLICATIONS

Winters et al., "The 1987 IADC Fixed Cutter Bit Classification System", SPE/IADC 16142, Mar. 1987.
Brett et al., "Bit Whirl: A New Theory of PDC Bit Failure", SPE 19571, Oct. 1989.
Osman et al., "On the Development of Multi-Edge Cutting Tools for BTA Deep-Hole Machining"; Journal of Engineering of Industry, May 1976, pp. 474–480.

*Primary Examiner*—Hoang C. Dang
*Attorney, Agent, or Firm*—Scott H. Brown; Fred E. Hook

[57] ABSTRACT

A subterranean drill bit operable with a rotational drive source is provided for drilling in subterranean earthen materials to create a borehole having a borehole wall. The drill bit comprises a drill bit body having a base portion, a gauge portion and a face portion disposed about a bit axis. A plurality of diamond cutting elements are fixedly disposed on and project from the face portion and are spaced from one another. The cutting elements are disposed for causing a net radial imbalance force during the drilling along a net radial imbalance force vector substantially perpendicular to the bit axis. A substantially continuous cutter devoid region is disposed on the gauge portion about the force point, and a bearing support is disposed in the cutter devoid region about the force point for substantially continuously contacting the borehole wall during the drilling. The cutting elements are positioned to cause the net radial imbalance force to substantially maintain the bearing support in contact with the borehole wall during the drilling, to cause the net radial imbalance force vector to have an equilibrium direction, and to cause the net radial imbalance force vector to return substantially to the equilibrium direction in response to a disturbing displacement.

26 Claims, 21 Drawing Sheets

FIG. 20A  FIG. 20B

LOW FRICTION SUBTERRANEAN DRILL BIT AND RELATED METHODS

This is a continuation-in-part of application Ser. No. 313,126, filed on Feb. 21, 1989, now abandoned.

BACKGROUND OF THE INVENTION

1. Field of the Invention

The invention relates to subterranean drill bits such as those used for subterranean mining and for drilling of subterranean oil and gas wells, and methods for manufacturing and using such subterranean drill bits.

2. Description of the Related Art

In subterranean drilling such as in the exploration and production of hydrocarbons, a rotating drill bit is used to create a borehole through the subsurface formations of the earth. Although a number of subterranean drill bit designs are known in the art, such designs may be broadly classified into two areas—(1) roller cone bits and (2) fixed cutter bits. The present invention is directed principally to fixed cutter bits. The term fixed cutter drill bits as used in this document refers to subterranean drill bits in which the position of the cutting surface of the cutting elements or cutters is fixed relative to the drill bit body. Although the specific design and physical appearance of fixed cutter drill bits can vary considerably, such drill bits share a number of common features. The International Association of Drilling Contractors (IADC) recently adopted a fixed cutter bit classification system based on such common features. See, e.g., W. J. Winters and H. H. Doiron, "The 1987 IADC Fixed Cutter Bit Classification System," presented at the 1987 Society of Petroleum Engineers (SPE/IADC) Drilling Conference held in New Orleans, La. on Mar. 15–18, 1987.

In recent years, fixed cutter subterranean drill bit designs using diamond materials for the cutting medium have gained widespread use in the oil and gas industry, particularly for use in subterranean formations having relatively soft to medium hardness. The cutting medium in these fixed cutter diamond drill bits typically comprises natural diamond, a poly-crystalline diamond compact material, or a thermally-stable poly-crystalline diamond material. Fixed cutter diamond drill bits typically include a significant number of diamond cutters distributed over the drill bit body. Although fixed cutter diamond drill bits are relatively expensive, their superior rate of penetration (ROP) (the rate at which the drill bit drills through the subterranean earthen materials) has increased their demand and made them indispensable for some applications.

Notwithstanding the popularity of fixed cutter subterranean drill bits, there has been a real concern in the industry about their susceptibility to breakage. The users of the drill bits and the drill bit manufacturers have found that by controlling more precisely the weight-on-bit (WOB) and increasing the rotational speed (RPM), increased penetration rates can be achieved. As the RPM is increased, the drill bit effective life has decreased dramatically because the cutting elements on the drill bit become damaged and occasionally are violently torn from the bit body. As the cutting elements break, the penetration rate of the bit decreases. When penetration rate falls unacceptably low, the drill bit must be withdrawn from the borehole and replaced. The drill bit can also fail catastrophically, which also requires bit replacement. The lifetimes of the drill bits can vary considerably. It is not unknown for subterranean drill bits to catastrophically fail when they are virtually new. The cost effectiveness of subterranean drilling is directly dependent upon maintaining good penetration rates and on prolonging drill bit lifetime. Replacement of drill bits is a very expensive process given the cost of operating the drilling rigs, the time required to withdraw the drill bit from the borehole, replace it, and reinsert the drill bit, and the cost of the bits themselves.

Prior attempts to improve fixed cutter subterranean drill bit durability have been closely associated with the prevailing theories of cutting element wear and drill bit failure. During the 1970s and early 1980s, the prevailing theories of cutter wear and bit failure focused primarily on heat buildup in the cutting elements. Heat buildup was believed to cause the individual cutting elements to undergo accelerated wear. Accordingly, attempts to improve drill bit durability during this time frame focused on decreasing heat buildup on the cutting elements, for example, by improving the hydraulic design of the drill bit to better cool the cutting elements.

Another theory of cutter wear and drill bit failure prevalent during the 1970s and early 1980s involved the degree of balance inherent in the drill bit. More specifically, research efforts indicated that drill bit failure was accompanied by damage to the cutting elements whereby the diamond material was chipped or broken off of their carbide supports. Given the number and positioning of the cutting elements on the bit body, this cutting element damage was believed to create unbalanced lateral or radial forces on the drill bit that forced the bit body to impact the borehole wall and further damage the drill bit. Accordingly, attempts to improve drill bit durability also included efforts to balance the drill bit so that the combined or net lateral forces on the bit during its rotation in drilling were balanced.

Various approaches were also used to strengthen the individual cutting elements, such as using beveled, domed, or high backrake cutters, using larger stud support materials for the cutters, using posts behind the cutters, and increasing the amount of diamond material on each cutting element.

Although some improvements in bit durability resulted from these efforts, a satisfactory solution to the cutter breakage problem was not found.

OBJECTS OF THE INVENTION

Accordingly, an object of the invention is to provide a subterranean drill bit that has improved durability and operating lifetime.

Another object of the invention is to provide a method for manufacturing a subterranean drill bit that provides for improved durability and operating lifetime of the drill bit.

Still another object of the invention is to provide a method for using a subterranean drill bit that provides for improved durability and operating lifetime of the drill bit.

Additional objects and advantages of the invention will be set forth in part in the description which follows, and in part will be apparent from the description, or may be learned by practice of the invention. The objects and advantages of the invention may be realized and attained by means of the elements and combinations particularly pointed out in the appended claims.

SUMMARY OF THE INVENTION

The invention arose from the extensive research efforts of the inventors in addressing the problems of drill bit durability described above. The inventors, having discovered a new theory of drill bit breakage referred to as backwards bit whirl, set out to design a subterranean drill bit and related methods that took advantage of the new theory.

Accordingly, to achieve the objects and in accordance with the purpose of the invention as embodied and broadly described in this document, the invention comprises a subterranean drill bit that is operable with a rotational drive source for drilling in subterranean earthen materials to create a borehole having a borehole wall. The drill bit comprises a drill bit body having a base portion disposed about a longitudinal bit axis for receiving the rotational drive source, a gauge portion disposed about the longitudinal bit axis and extending from the base portion, and a face portion disposed about the longitudinal bit axis and extending from the gauge portion. The drill bit further comprises a plurality of diamond cutting elements fixedly disposed on and projecting from the face portion and spaced from one another. The cutting elements are disposed for creating a net radial imbalance force during the drilling along a net radial imbalance force vector approximately perpendicular to the longitudinal bit axis. The drill bit also includes a substantially continuous cutter devoid region disposed on the gauge portion and on the face portion and intersecting a force plane formed by the longitudinal bit axis and the net radial imbalance force vector, and bearing means disposed in the cutter devoid region about the force plane for substantially continuously contacting the borehole wall during the drilling. In accordance with the invention, the cutting elements are positioned to cause the net radial imbalance force to substantially maintain the bearing means in contact with the borehole wall during the drilling, to cause the net radial imbalance force vector to have an equilibrium direction, and to cause the net radial imbalance force vector to return substantially to the equilibrium direction in response to a disturbing displacement.

Contrary to teachings in the prior art that the drill bit should include cutters disposed around the gauge and face portions of the drill bit body and that the radial forces on the bit body should be balanced, the inventors discovered that the durability of the drill bit can be improved by purposely providing a non-zero net radial imbalance force vector. The inventors further discovered that, by designing the drill bit to control the magnitude and direction of the radial imbalance force vector, and by disposing a cutter devoid region and bearing means on a selected location on the drill bit body corresponding to the direction of the net radial imbalance force vector, stable drill bit rotation and prolonged drill bit lifetime can be achieved. The center of rotation of the drill bit remains at a substantially fixed location on the drill bit body during the drilling, and backwards whirling and its damaging effects can be avoided.

The design of a drill bit in accordance with the invention is such that the drill bit remains stable not only for stable, uniform drilling conditions, but is also dynamically stable in the event of disturbing displacements. The direction of the net radial imbalance force vector substantially returns to a location corresponding to the location of the bearing means even in the event of such disturbing displacements.

In accordance with one aspect of the invention, the bearing means comprises a substantially smooth wear resistant sliding surface disposed in the cutter devoid region about the force plane for slidably contacting the borehole wall during the drilling. The sliding surface may comprise a plurality of spaced sliding surface zones.

In accordance with another aspect of the invention, the bearing means may comprise a roller rotatably mounted within the drill bit body so that an edge of the roller extends beyond the drill bit body about the plane.

The net radial imbalance force vector can be controlled in several ways but, preferably, is controlled by properly selecting the arrangement of the cutting elements. Thus, in accordance with another aspect of the invention, the plurality of diamond cutting elements are fixedly disposed on and project from the face portion, and are spaced from one another. The cutting elements are disposed for creating a net radial imbalance force during the drilling along a net radial imbalance force vector approximately perpendicular to the longitudinal bit axis. The net radial imbalance force vector corresponds to a combination of a circumferential imbalance force vector and a radial imbalance force vector. In accordance with this aspect, the cutting elements preferably are disposed to direct the circumferential imbalance force vector and/or the radial imbalance force vector to a position corresponding to the bearing means.

The invention also includes a method for making a subterranean drill bit operable with a rotational drive source for drilling in subterranean earthen materials to create a borehole having a borehole wall. The manufacturing method of the invention comprises selecting a simulated drill bit body having a base portion disposed about a longitudinal bit axis for receiving the rotational drive source, a gauge portion disposed about the longitudinal bit axis and extending from the base portion, and a face portion disposed about the longitudinal bit axis and extending from the gauge portion. The method also includes a step of selecting a simulated cutting element arrangement in which a plurality of diamond cutting elements are fixedly disposed on and project from the face portion and are spaced from one another, and a step of determining a net radial imbalance force vector for the selected simulated cutting element arrangement to obtain an equilibrium direction for the net radial imbalance force vector. The method further includes a step of disposing a simulated substantially continuous cutter devoid region on the gauge portion and on the face portion and intersecting a force plane formed by the longitudinal bit axis and the net radial imbalance force vector, and a step of disposing a simulated bearing support in the cutter devoid region about the force plane for substantially continuously contacting the borehole wall during the drilling. The method also includes a step of determining a location of the net radial imbalance force vector for a preselected range of disturbing displacements of the drill bit, and a step of modifying the previously selected simulated cutting element arrangement as necessary so that the modified cutting element arrangement causes the net radial imbalance force to substantially maintain the bearing support in contact with the borehole wall during the drilling and to cause the net radial imbalance force vector to return substantially to the equilibrium direction in response to the disturbing displacements. The manufacturing method of the invention still further includes a step of disposing a plurality of cutting elements, a cutter devoid region, and a bearing support on a drill bit body in accordance with the modified simulated cutting element arrangement, the simulated cutter devoid region, and the simulated bearing support. The cutting elements can be disposed on the bit by any one of a number of known methods, such as bolting, brazing, press filling, heat shrinking or gluing.

The invention also includes a method of drilling in subterranean earthen materials to create a borehole having a borehole wall. The drilling method of the invention includes connecting a subterranean drill bit to a rotational drive source. The drill bit used for this step comprises a drill bit body having a base portion disposed about a longitudinal bit axis for receiving the rotational drive source, a gauge portion disposed about the longitudinal bit axis and extending from the base portion, and a face portion disposed about the longitudinal bit axis and extending from the gauge portion. The drill bit also includes a plurality of diamond cutting elements fixedly disposed on and projecting from the face portion and spaced from one another. The cutting elements are disposed for creating a net radial imbalance force during the drilling along a net radial imbalance force vector approximately perpendicular to the longitudinal bit axis. The drill bit also includes a substantially continuous cutter devoid region disposed on the gauge portion and on the face portion and intersecting a force plane formed by the longitudinal bit axis and the net radial imbalance force vector, and a bearing support disposed in the cutter devoid region about the force plane for substantially continuously contacting the borehole wall during the drilling. The drilling method of the invention also includes rotating and lowering the drill bit into the borehole to contact the subterranean earthen materials so that the net radial imbalance force vector substantially maintains the bearing support in contact with the borehole wall during the drilling, the net radial imbalance force vector has an equilibrium direction, and the net radial imbalance force vector returns substantially to the equilibrium direction in response to a disturbing displacement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of this specification, illustrate preferred embodiments and methods of the invention and, together with the description, serve to explain the principles of the invention.

FIGS. 20A-20C show an individual cutting element of a subterranean drill bit and the forces acting on the cutting element during drilling.

DETAILED DESCRIPTION OF THE PREFERRED EMBODIMENTS AND METHODS

Figure 1A:
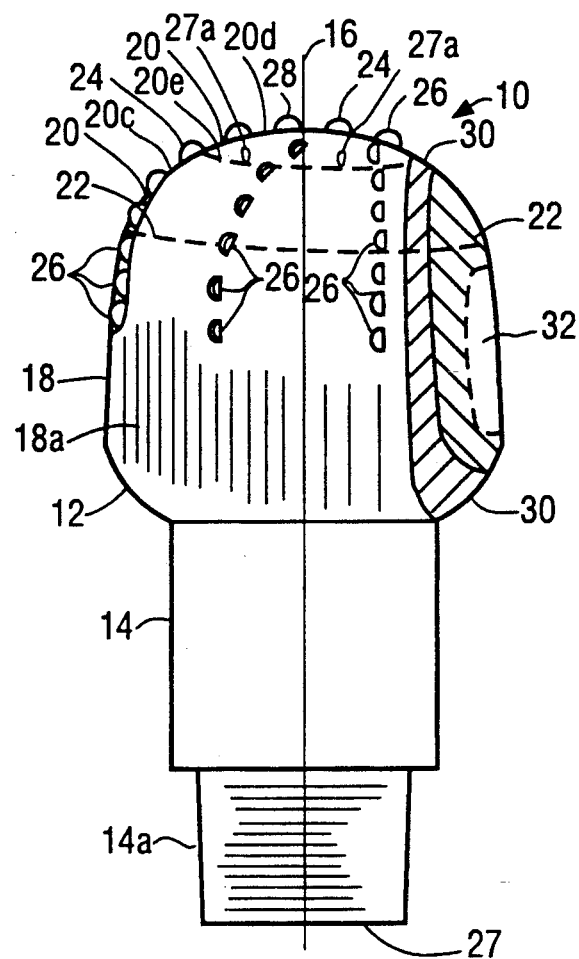
FIG. 1A shows a side view of a subterranean drill bit in accordance with the first preferred embodiment of the invention.

The preferred embodiments and methods of the invention will now be described with reference to the drawings, wherein like reference characters refer to like or corresponding parts throughout the drawings.

In accordance with the invention, a subterranean drill bit is provided, for example, for subterranean drilling of oil and gas wells or subterranean mining. The subterranean drill bit is operable with a rotational drive source, not shown in the drawings, for drilling in subterranean earthen materials to create a borehole having a borehole wall. The rotational drive source may comprise a commercially available drilling rig with a drillstring or downhole motor suitable for connection to commercially available subterranean drill bits.

Further in accordance with the invention, the subterranean drill bit includes a drill bit body having a base portion disposed about a longitudinal bit axis for receiving the rotational drive source, a gauge portion disposed about the longitudinal bit axis and extending from the base portion, and a face portion disposed about the longitudinal bit axis and extending from the gauge portion. The base portion, gauge portion, and face portion preferably form a unitary bit body.

Figure 1B:
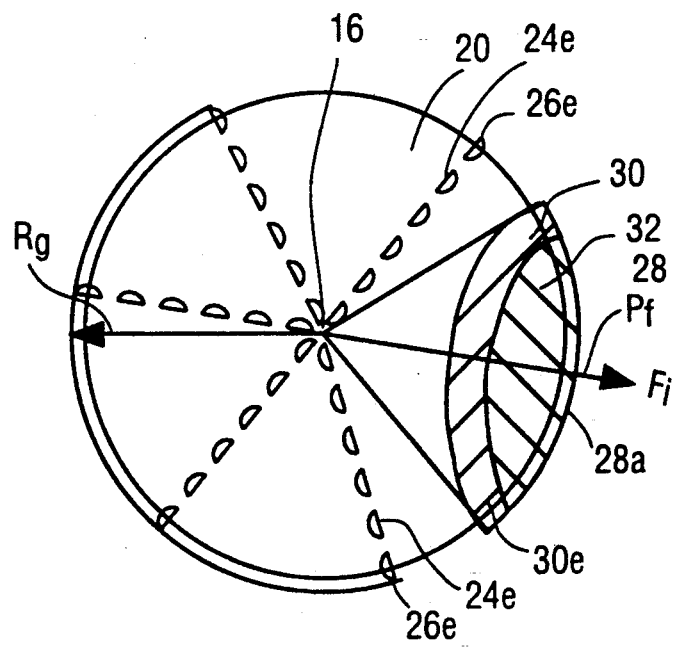
FIG. 1B shows a face or longitudinal view of the subterranean drill bit shown in FIG. 1A.

A first preferred embodiment of a subterranean drill bit according to the invention, designated by reference numeral 10, is shown in FIGS. 1A and 1B. FIG. 1A shows a side view, and FIG. 1B shows a longitudinal view, corresponding to a view of an operational drill bit taken from the bottom of the borehole. Drill bit 10 includes a drill bit body 12 having a cylindrical shank or base portion 14 disposed about a longitudinal bit axis 16 for receiving the rotational drive source. Base portion 14 includes a threaded pin 14a that can be connected in a known manner to a drillstring that constitutes part of the rotational drive source. Longitudinal bit axis 16, a theoretical construct used for reference purposes and for ease of illustration, extends through the center of base portion 14 substantially parallel to the drillstring. Radial dimension, as the term is used in this document, refers to positions located or measured perpendicularly outward from longitudinal bit axis 16, for example, as shown in FIG. 1B.

Drill bit body 12 has a substantially cylindrical gauge portion 18 disposed about bit axis 16 and extending from base portion 14 that includes a cylindrical wall substantially parallel to bit axis 16. Because of the substantially cylindrical shape of gauge portion 18, the gauge portion has a constant gauge radius $R_g$ measured radially outward and perpendicularly from longitudinal bit axis 16 to the surface of the gauge portion, as shown in FIG. 1B. Gauge portion 18 preferably includes a plurality of grooves 18a extending parallel to bit axis 16 to facilitate the removal of rock flower, drilling mud, and debris.

Drill bit body 12 also includes a face portion 20 disposed about bit axis 16 and extending from gauge portion 18. Gauge portion 18 and face portion 20 can be considered to meet at a line 22 at which the radius (FIG. 1A) of the drill bit body begins to transition from having the constant gauge radius. Line 22 therefore represents the circumference of the gauge portion.

Figure 2A:
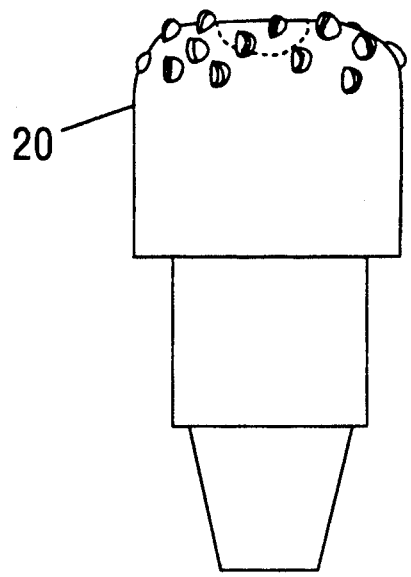
FIG. 2A shows a side view of a subterranean drill bit having a concave profile.
Figure 2B:
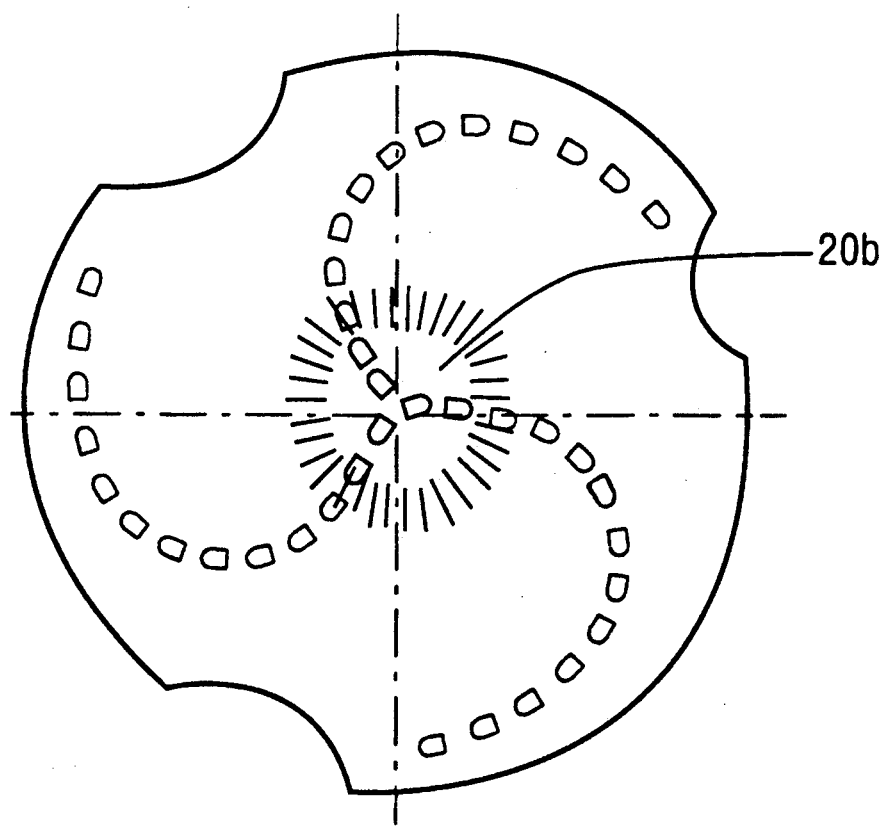
FIG. 2B shows a face or longitudinal view of the subterranean drill bit shown in FIG. 2A.
Figure 3A:
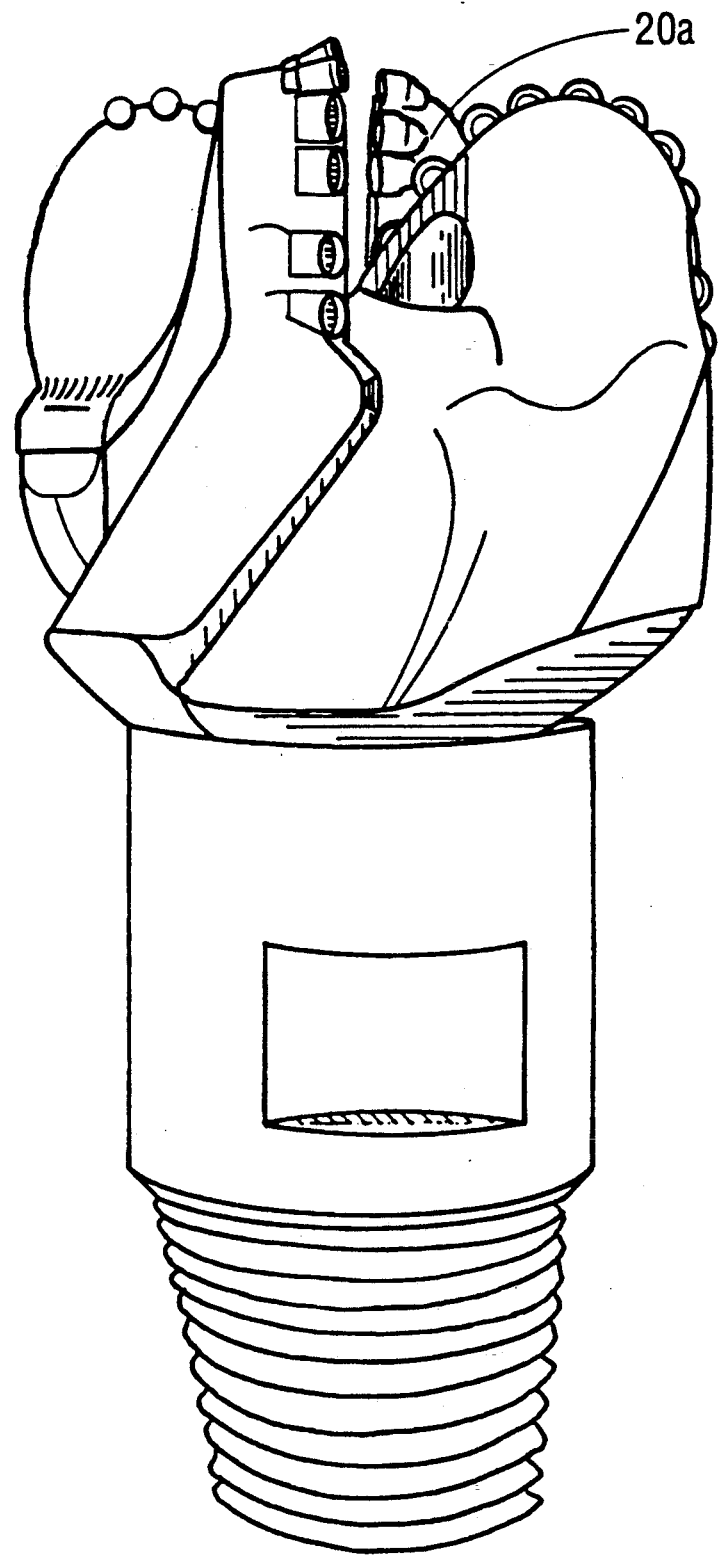
FIG. 3A shows a side view of a subterranean drill bit having a bladed design.
Figure 3B:
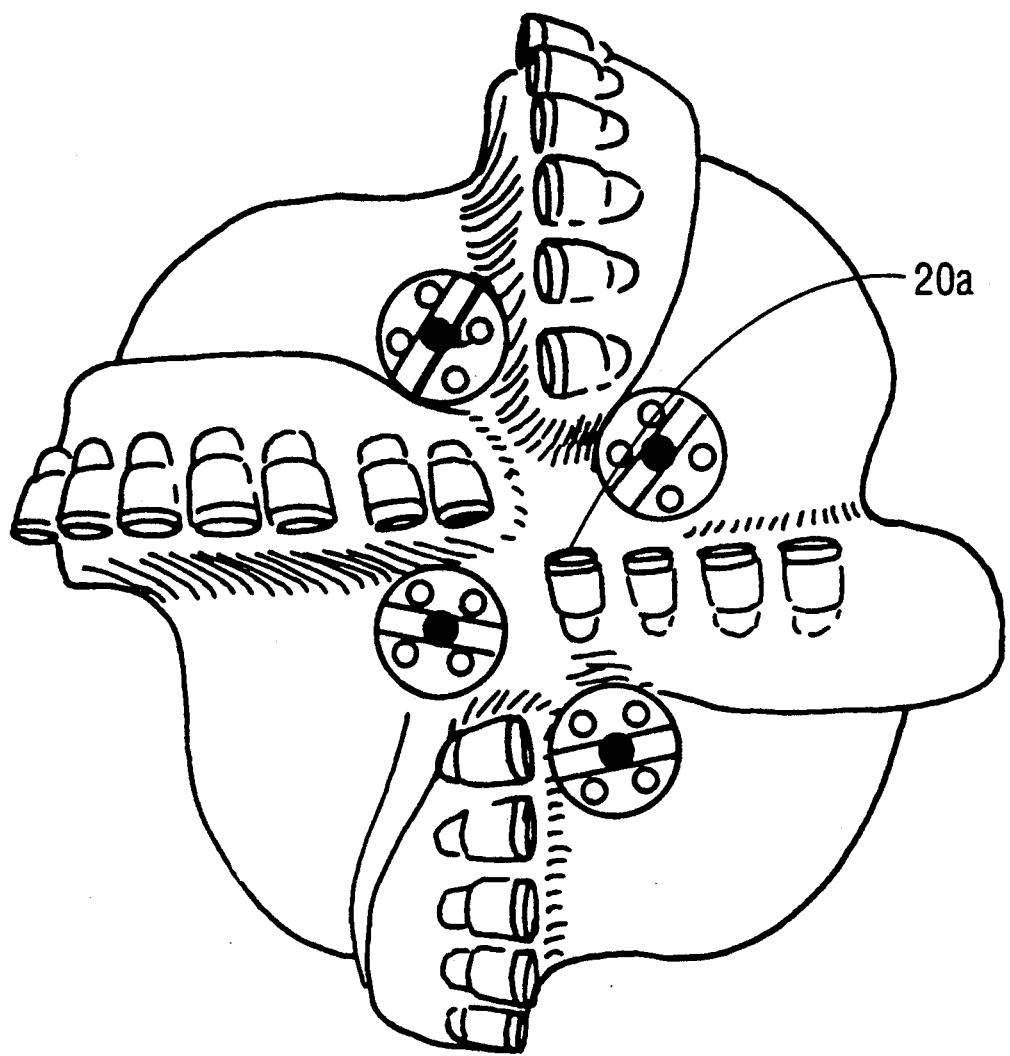
FIG. 3B shows a face or longitudinal view of the subterranean drill bit shown in FIG. 3A.

The drill bit body shown in FIG. 1A has a curved profile, i.e., the cross-sectional profile of face portion 20, when viewed from a side view perpendicular to the bit axis (as shown in FIG. 1A), has a crown-shaped surface profile. The face portion, when viewed from this perspective, may, for example, have a spherical, parabolic, or other curved shape. Such profiles, however, are not limiting. For example, the face portion may be flat. Alternatively, it may have a concave profile as shown in FIGS. 3A and 3B, in which the face portion includes a concave region 20a disposed about bit axis 16. The face portion may also include a plurality of curved blades 20b, as shown in FIGS. 2A and 2B.

In a with the invention, the subterranean drill bit further includes a plurality of diamond cutting elements fixedly disposed on and projecting from the face portion and spaced from one another. Preferably, the invention further includes a plurality of diamond cutting elements, spaced from the face portion cutting elements, fixedly disposed on and projecting from the gauge portion and spaced from one another, such as gauge cutting elements or gauge trimmers.

Figure 4A:
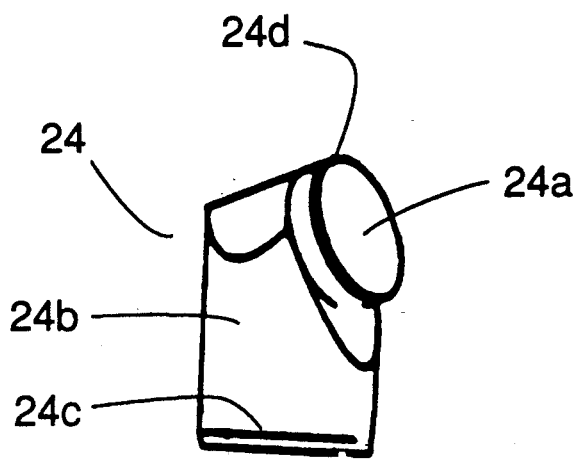
FIG. 4A shows a perspective view of an individual cutting element.
Figure 4B:
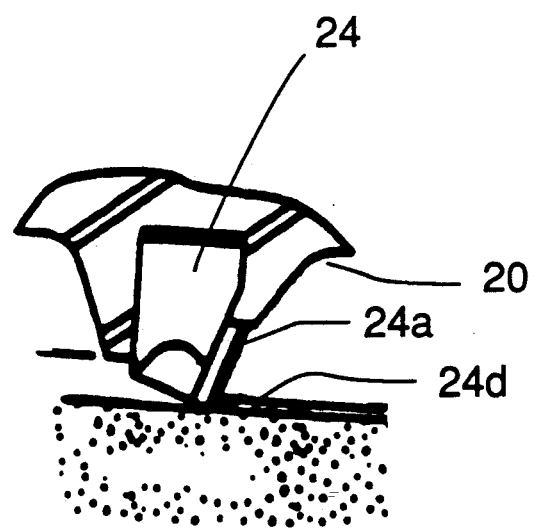
FIG. 4B shows the cutting element of FIG. 4A mounted to the face portion of the drill bit shown in FIGS. 1A and 1B.

As applied to the preferred embodiment of FIGS. 1A and 1B, drill bit 10 includes a plurality of discrete cutting elements or cutters 24 fixedly disposed on and projecting from face portion 20 and spaced from one another. FIG. 4A shows an individual one of cutters 24, and FIG. 4B shows the cutting element of FIG. 4A disposed in face portion 20 and contacting a rock formation. Each of the cutting elements preferably comprises a poly-crystalline diamond compact material 24a mounted on a support 24b, such as a carbide support. The cutting elements may, of course, include other materials such as natural diamond and thermally stable polycrystalline diamond material. Each of the cutting elements is disposed in face portion 20 at its base 24c. Each of cutting elements 24 has a cutting edge 24d for contacting the subterranean earthen materials to be cut.

Figure 5:
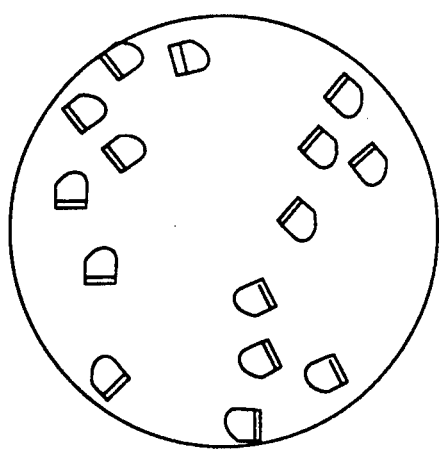
FIG. 5 shows a face or longitudinal view of a subterranean drill bit in which the cutting elements are positioned in a nonuniform pattern on the face portion.

As shown in FIG. 1B, cutting elements 24 are positioned in a linear pattern along the radial dimension on face portion 20. This is by way of illustration, however, and not by way of limitation. For example, cutting elements 24 may be positioned in a nonlinear pattern along a radial dimension of the face portion to form a plurality of curved blades, as shown in FIG. 2B, or they may be positioned in a nonuniform pattern on the face portion as shown in FIG. 5.

As embodied in the drill bit of FIG. 1A, the gauge cutting elements comprise cutting elements 26 which are similar or identical to cutting elements 24. Cutting elements 26 are disposed on gauge portion 18 with their cutting edges positioned at a uniform radial distance from bit axis 16 to define gauge radius $R_g$, as shown in FIG. 1B. Cutting elements 26 are spaced from cutting elements 24 and from one another. As shown in FIG. 1A, cutting elements 26 preferably are aligned with corresponding ones of cutting elements 24, and two or more cutting elements 26 preferably extend linearly along the gauge portion in the axial direction of the bit. These gauge cutters define the gauge or radial dimension of the borehole wall, and serve to finish the borehole wall. The gauge cutters prolong bit lifetime, given that gauge cutters closer to face portion 20 will wear faster than gauge cutters farther from the face portion so the gauge cutters wear in sequential rather than simultaneous fashion.

The length and geometry of the cutting edges for cutting elements 24 and 26 will depend on the specific design and application. The cutting edges are usually curved, e.g., circular in cross-section, but may be flat, chiseled or beveled. Cutting elements 24 and 26 typically are circular or substantially circular cutting elements, and have a diameter within the range of 0.25 to 2.0 inches, most typically 0.5 inches. In most applications, the dimensions of cutting elements 26 are the same as those described above for cutting elements 24, but this need not be the case for all applications.

The number of individual cutting elements on the drill bit can vary considerably within the scope of the invention, depending on the specific design of and application for the drill bit. Drill bit 10 preferably includes at least 15 individual cutting elements, but this is not limiting. For example, a drill bit having an outside diameter of 8.5 inches would usually have between 25–40 individual cutting elements, approximately 17 to 28 on the face portion and approximately 8 to 12 on the gauge portion. A 17.5 inch diameter bit might have over 100 separate cutting elements. It is known that commercially available drill bits used in subterranean drilling range from bore sizes of 2 inches to 25 inches, although the most widely used sizes fall within the range of 6.5 to 12.25 inches.

In accordance with the invention, the cutting elements are disposed for creating a net radial imbalance force during the drilling along a net radial imbalance force vector $F_i$ (FIG. 1B) approximately perpendicular to the longitudinal bit axis. The magnitude and direction of net radial imbalance force vector $F_i$ will depend on the positioning and orientation of the cutting elements, e.g., the specific arrangement of cutting elements 24 and 26 on drill bit 10, and the shape of the drill bit as the shape influences cutter position. Orientation includes backrake and siderake. The magnitude and direction of force vector $F_i$ is also influenced by a number of factors such as the specific design of the individual cutting elements, the weight-on-bit load applied to the drill bit, the speed of rotation, and the physical properties of the materials being drilled.

Drill bit 10 includes an internal fluid flow channel 27, such as the drillstring bore, and a plurality of nozzles 27a, e.g., of known design, disposed on face portion 20 and in fluid communication with flow channel 27. Flow channel 27 and nozzles 27a provide a lubricating fluid such as drilling mud to face portion 20 of the drill bit during the drilling to lubricate the drill bit and remove rock cuttings.

The invention further includes a substantially continuous cutter devoid region disposed on the gauge portion and on the face portion and intersecting a force plane $P_f$ formed by the longitudinal bit axis and net radial imbalance force vector $F_i$.

As applied to the first preferred embodiment, drill bit 10 includes a substantially continuous cutter devoid region 30 disposed on gauge portion 18 and on face portion 20. Cutter devoid region 30 comprises a substantially continuous region of gauge portion 18 and face portion 20 from which cutting elements and abrasive surfaces have been removed. Cutter devoid region intersects and is disposed about force plane $P_f$, which is formed by longitudinal bit axis 16 and net radial imbalance force vector $F_i$. Force plane $P_f$ is a theoretical construct used for reference and illustrative purposes to identify locations on the bit body, e.g., the gauge portion, corresponding to the direction of net radial imbalance force vector $F_i$. For example and with reference to the drawings, force plane $P_f$ lies in the plane of the drawing sheet of FIG. 1A and extends outwardly from longitudinal bit axis 16 through the center of cutter devoid region 30. When the drill bit is viewed longitudinally as shown in FIG. 1B, plane $P_f$ emerges perpendicularly from the drawing sheet with its projection corresponding to net radial imbalance force vector $F_i$. Force plane $P_f$ is important because net radial imbalance force vector $F_i$ may not always intersect gauge portion 18. In some instances, force vector $F_i$ may extend outward radially from bit axis 16 at or near face portion 20 directly toward the borehole wall without passing through gauge portion 18. Even in these instances, however, the direction of force vector $F_i$ will correspond to a point or line on gauge portion 18 toward which the net radial imbalance force is directed, as seen in the longitudinal projection of FIG. 1B, and this point or line on gauge portion 18 lies within force plane $P_f$.

Cutter devoid region 30 extends the full longitudinal length of gauge portion 18, and further extends onto face portion 20 along the circumferential and radial dimensions. Cutter devoid region 30 preferably extends circumferentially along a maximum of 90% of the gauge circumference and, for many applications, extends along about 20% to 70% of the gauge circumference. Selected ones of cutting elements 24 and 26, for example, cutting elements 24e and 26e, are positioned adjacent to cutter devoid region 30, for example, to increase the number of cutters on the drill bit and thereby improve its cutting efficiency.

The invention further includes bearing means disposed in the cutter devoid region about the force plane for substantially continuously contacting the borehole wall during the drilling. Preferably, the bearing means includes a leading portion, and the cutting elements are positioned to direct net radial imbalance force vector $F_i$ to a location corresponding to the leading portion during the drilling. According to one aspect of the invention, the bearing means comprises a substantially smooth, wear-resistant sliding surface disposed in the cutter devoid region about the force plane for slidably contacting the borehole wall during the drilling. The sliding surface intersects the force plane formed by the longitudinal bit axis and the net radial imbalance force vector.

Figure 6A:
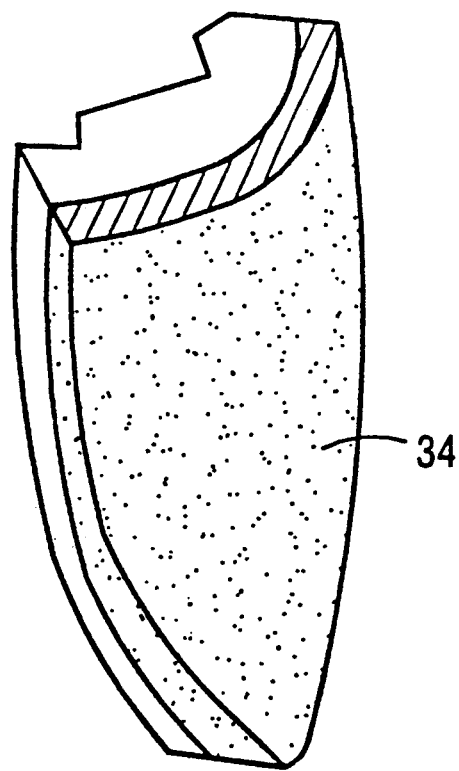
FIG. 6A shows a sliding surface for the drill bit of FIGS. 1A and 1B with a wear-resistant coating.
Figure 6B:
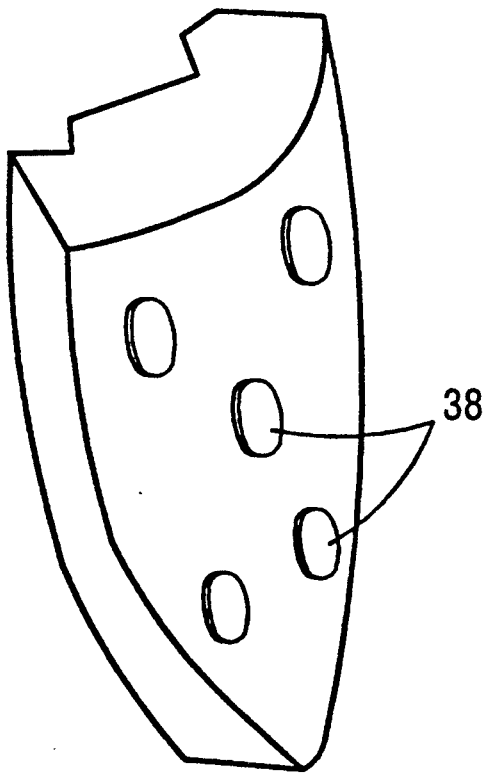
FIG. 6B shows a sliding surface for the drill bit of FIGS. 1A and 1B with a plurality of diamond stud inserts.
Figure 6C:
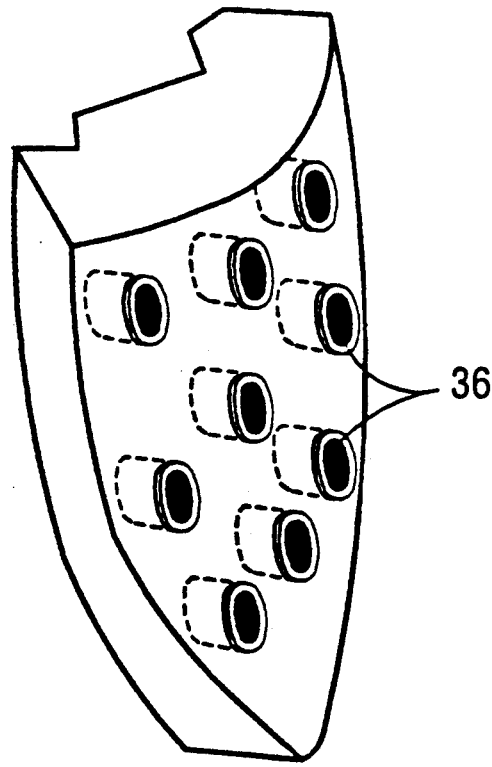
FIG. 6C shows a sliding surface for the drill bit of FIGS. 1A and 1B with a plurality of thin diamond pads.

As applied to the first preferred embodiment, the bearing means comprises a substantially smooth sliding surface 32 disposed in cutter devoid region 30 about force plane $P_f$. Sliding surface 32 constitutes a substantially continuous region that has a size equal to or smaller than cutter devoid region 30. Sliding surface 32 is disposed on gauge portion 18. Sliding surface 32 may comprise the same material as other portions of drill bit body 12, or a relatively harder material such as a carbide material. In addition, sliding surface 32 may include a wear-resistant coating or diamond impregnation 34 as shown in FIG. 6A, a plurality of diamond stud inserts 36 as shown in FIG. 6B, a plurality of thin diamond pads 38 as shown in FIG. 6C, or similar inserts or impregnation that strengthen sliding surface 32 and improve its durability.

The specific size and configuration of sliding surface 32 will depend on the specific drill bit design and application. Generally, sliding surface 32 should have a curvature to match the intended curvature of the borehole to be drilled. Preferably, the sliding surface extends along substantially the entire longitudinal length of gauge portion 18 and extends circumferentially along no more than 90% of the gauge circumference. For most applications, the sliding surface will extend along about 20% to 70% of the gauge circumference but, in virtually all applications, the sliding surface extends along a minimum of about 20% of the gauge circumference.

Sliding surface 32 is of sufficient surface area so that, as the sliding surface is forced against the borehole wall, the applied force per square inch will be significantly less than the compressive strength of the subsurface material. This keeps the sliding surface from digging into and crushing the borehole wall, which would result in the creation of an undesired bit whirling motion as described more fully below. Sliding surface 32 also has a size sufficient to encompass net radial imbalance force vector $F_i$ as force vector $F_i$ moves in response to a change in hardness of the subterranean earthen materials, and other disturbing forces. The size of the sliding surface should also be selected so that the net radial imbalance force vector is directed toward a location corresponding to the sliding surface as the bit wears.

Figure 7A:
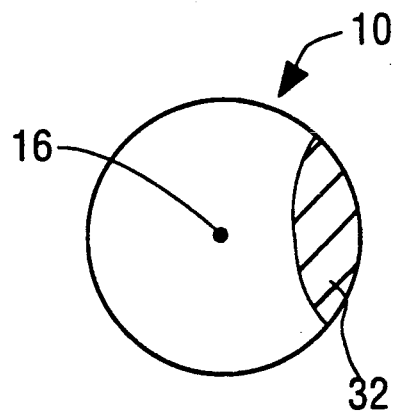
FIG. 7A shows the subterranean drill bit of FIG. 1A with the sliding surface located at a gauge radial position.
Figure 7B:
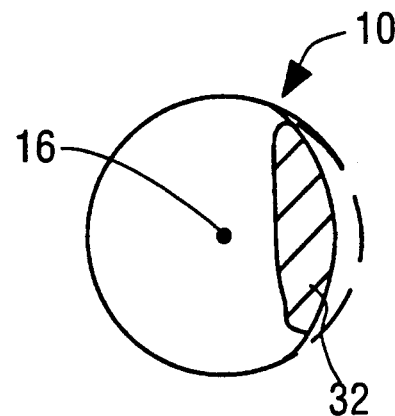
FIG. 7B shows the subterranean drill bit of FIG. 1A with the sliding surface located at an undergauge radial position.
Figure 7C:
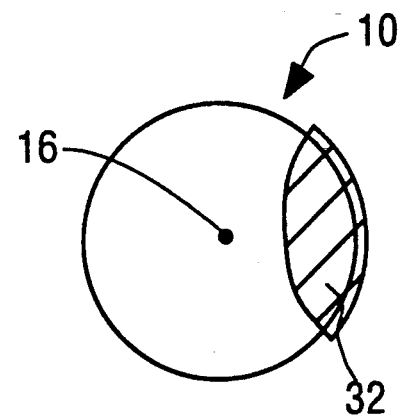
FIG. 7C shows the subterranean drill bit of FIG. 1A with the sliding surface located at an overgauge radial position.

Several radial locations for sliding surface 32 are possible. For example, as shown in FIGS. 1B and 7A, sliding surface 32 is substantially circular and is located at a radial distance from bit axis 16 that is approximately equal to the gauge radius, i.e. the sliding surface is gauge. The sliding surface may also be located at a radial distance from the longitudinal bit axis that is less than the gauge radius, i.e., the sliding surface may be undergauge, as shown in FIG. 7B. Alternatively, the sliding surface may be located at a radial distance from the bit axis that is greater than the gauge radius, i.e., the sliding surface may be overgauge, as shown in FIG. 7C.

Figure 8A:
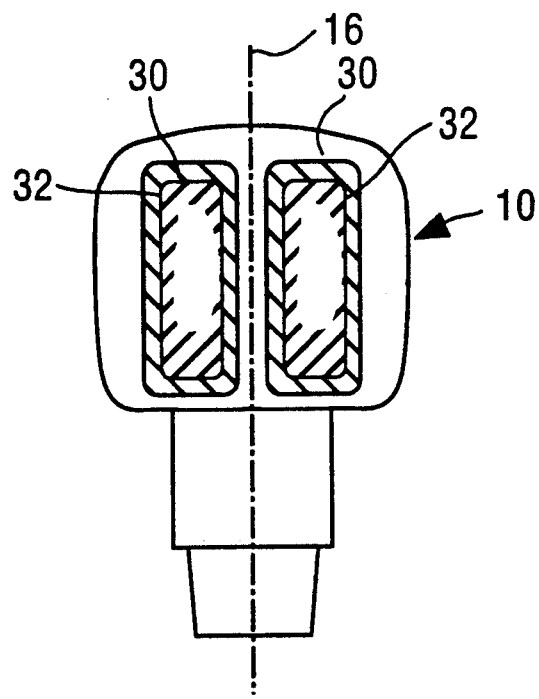
FIG. 8A shows a side view of a subterranean drill bit in accordance with the modification of the first preferred embodiment of the invention that include a plurality of spaced sliding zones.
Figure 8B:
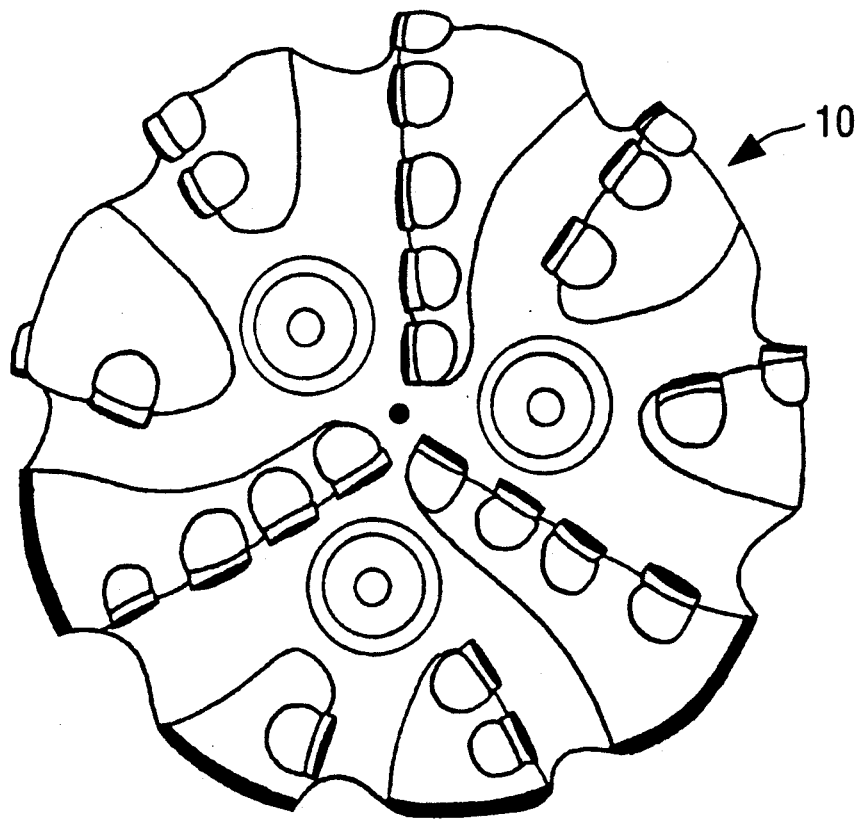
FIG. 8B shows a face or longitudinal view of the subterranean drill bit shown in FIG. 8A.

Sliding surface 32 as shown in FIGS. 1A and 1B comprises a continuous surface. The sliding surface may, however, comprise a plurality of spaced sliding surface zones, as shown in FIGS. 8A and 8B. This facilitates hydraulic flow around the drill bit body which improves drilling efficiency and promotes cooling of the bit. This design is preferred for certain drilling applications.

Further in accordance with the invention, the cutting elements are disposed to cause net radial imbalance force vector $F_i$ to substantially maintain the bearing means in contact with the borehole wall during the drilling, to cause net radial imbalance force vector $F_i$ to have an equilibrium direction, and to cause net radial imbalance force vector $F_i$ to return substantially to the equilibrium direction in response to a disturbing displacement. As indicated above, the positioning and orientation of the cutting elements to cause these results may be accomplished by controlling the size of the cutting elements, their location on the drill bit body, and the shape of the drill bit body onto which the cutting elements are disposed. Appropriate selection of the individual cutting elements is also relevant to control force vector $F_i$. These aspects of the invention and the related forces on the drill bit will be discussed in greater detail below.

An appreciation for the invention and its corresponding advantages is facilitated by an understanding of the various forces acting on the drill bit during drilling, and the relationship of these forces to a new theory of fixed cutter subterranean drill bit failure related to backwards bit whirl, as recently discovered by the present inventors.

Figure 9A:
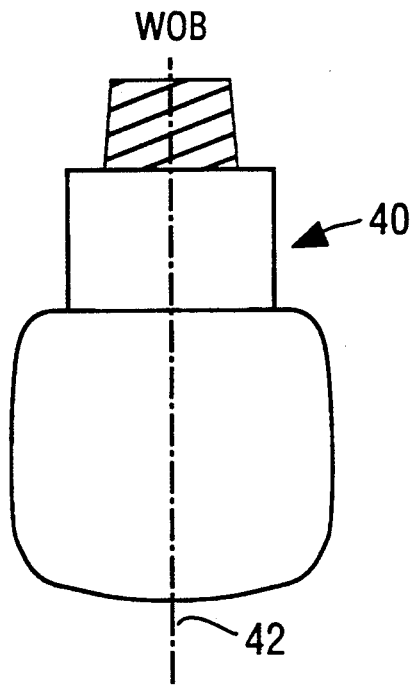
FIG. 9A shows a side view of a subterranean drill bit.

The principal forces acting on a subterranean drill bit as it drills through subterranean earthen materials include a drilling torque, the weight-on-bit, a radial imbalance force $F_{ri}$, a circumferential imbalance force $F_{ci}$, and a radial restoring force. With reference to FIG. 9A, the weight-on-bit is a longitudinal or axial force applied by the rotational drive source (drillstring) that is directed toward the face portion of the bit. Subterranean drills are often subject to weight-on-bit loads of 10,000 lbs or more. Circumferential imbalance force $F_{ci}$ and the radial imbalance force $F_{ri}$ are radial forces in a radial plane perpendicular to the longitudinal bit axis, i.e., in the radial or lateral dimension of the bit body. An example of the radial plane corresponds to the plane of the drawing sheet for FIGS. 1B and 9B through 9D.

Figure 9B:
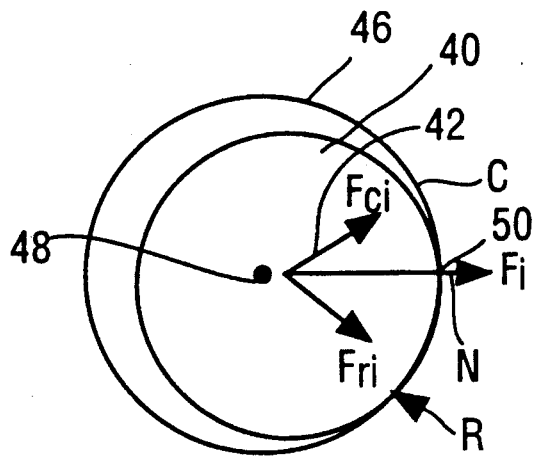
FIG. 9B shows a face or longitudinal view of a subterranean drill bit rotating in a borehole for purposes of illustrating the forces acting on the drill bit.

The radial imbalance force component or vector $F_{ri}$ is the radial component of the force created on the drill bit when the bit is loaded in the axial direction. The magnitude and direction of force vector $F_{ri}$ is independent of the speed of rotation of the bit, and instead is a function of the shape of the drill bit, the location, orientation, and shape of the cutting elements, the physical properties of the subsurface formation being drilled, and the weight-on-bit. The location, orientation, and shape of the cutters, however, usually are the factors most amenable to control. Force vector $F_{ri}$ is perpendicular to the longitudinal bit axis and intersects with a longitudinal projection of the gauge circumference at a point R, as shown in FIG. 9B. If the drill bit and its cutting elements are perfectly symmetrical about the longitudinal bit axis and if the weight on the bit is applied directly along the bit axis, then the radial imbalance force $F_{ri}$ will be zero. However, in the preferred embodiment, the drill bit and cutting elements are shaped and positioned so that a non-zero force $F_{ri}$ is applied to the drill bit when the bit is axially loaded. The force $F_{ri}$ can be substantial, up to thousands of pounds.

Figure 9C:
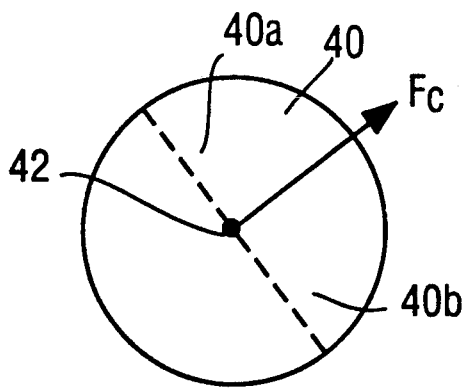
FIG. 9C shows a face or longitudinal view of a subterranean drill bit for purposes of illustrating the circumferential imbalance force on the drill bit.

The circumferential imbalance force component or vector $F_{ci}$ is the net radial component in the radial plane, obtained by vectorially summing the forces attributable to the interaction of the drill bit, primarily the individual cutting elements, with the borehole bottom and walls as the bit rotates. This circumferential imbalance force can be represented as a vector $F_{ci}$ (as shown in FIGS. 9B and 9C) which passes through the longitudinal bit axis and intersects with a longitudinal projection of the gauge circumference at point C on the longitudinal projection of FIG. 9B. As explained below, the circumferential imbalance force $F_{ci}$ can vary, depending upon both the design of the drill bit (shape of the bit and shape and positioning of cutting elements), the operation of the drill bit, and the earthen materials being drilled.

For example, FIG. 9C shows a longitudinal view of a drill bit 40 having a plurality of cutting elements disposed on the face portion of the bit body to create a pair of linear cutting blades 40a and 40b symmetric with respect to one another. If such a bit rotates about the bit axis, and if cutting blades 40a and 40b cut a homogeneous material so they experience symmetric forces, the respective blades will correspond to a force couple or torque with zero net force directed away from the bit axis. If, however, cutting blades 40a and 40b are not perfectly symmetric, or if they cut heterogeneous material so they experience different or asymmetric forces, the respective blades will create both a torque about a center of rotation displaced from the bit axis and a non-zero net circumferential imbalance force $F_{ci}$ in the radial dimension toward the point C on the projection of the bit. Subterranean drill bits usually create a non-zero circumferential imbalance force $F_{ci}$. As will be explained in greater detail below, the present invention is directed to a drill bit that is intentionally designed to create a substantial circumferential imbalance force $F_{ci}$.

The circumferential imbalance force vector $F_{ci}$ and the radial imbalance force vector $F_{ri}$ combine to create the net radial force vector $F_i$, which is substantially perpendicular to the longitudinal bit axis and which intersects with a longitudinal projection of the gauge circumference at a point N (FIG. 9B). This force point N indicates the point or region on a projection of the gauge circumference corresponding to the portion of the drill bit body that contacts the borehole wall in response to the net radial imbalance force vector $F_i$ at a given time. Given the geometries of the drill bit body and the borehole wall, the gauge portion of the drill bit body will contact the borehole wall. The bearing means is disposed on the drill bit body at a location that generally corresponds to this contacting portion of the drill bit body to provide the radial restoring force required to balance force vector $F_i$.

Figure 9D:
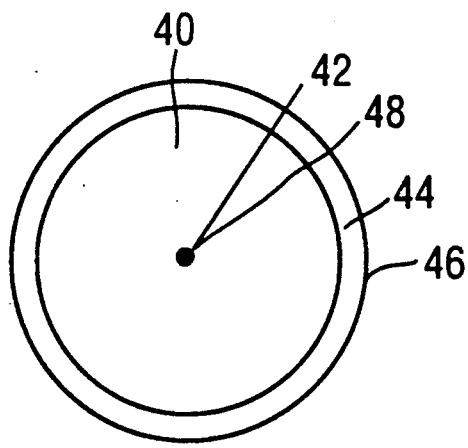
FIG. 9D shows a face or longitudinal view of a subterranean drill bit rotating in a borehole wall for purposes of illustrating static stability.

An appreciation of the invention is further facilitated by an understanding of the concepts of static and dynamic stability as they apply to low friction drill bits in accordance with the invention. Statically stable bit rotation, as the term is used in this document, can be defined as a condition in which the center of rotation of the drill bit stays at a fixed point on the drill bit surface in the absence of a disturbing force or a formation heterogeneity. For example, FIG. 9D shows a drill bit 40 with a longitudinal bit axis 42 similar to bit axis 16. Drill bit 40 rotates in a borehole 44 having a cylindrical borehole wall 46. The center of borehole 44 is designated by reference numeral 48. Because drill bit 40 rotates about a fixed center of rotation on the bit surface, i.e., longitudinal bit axis 42, the rotation is statically stable. A condition in which drill bit 40 is rotated about a fixed point on the drill bit surface, but in which this center of rotation on the drill bit is not co-located with borehole center 48, would also be considered statically stable rotation. Statically stable bit rotation is usually accompanied by a net radial imbalance force vector $F_i$ that has a substantially constant magnitude and direction relative to the drill bit body. The direction of this constant force vector $F_i$ can be considered an equilibrium direction.

Dynamic stability, as the term is used in relation to low friction subterranean drill bits in accordance with the invention, refers to a condition in which the net radial imbalance force vector $F_i$ returns to an equilibrium direction in response to a disturbing displacement. The disturbing displacement may be caused by a number of factors, such as the encountering of a change in subterranean earthen material hardness, the off axis movement of the drill bit itself, and drillstring vibrations.

A subterranean drill bit may have static stability, i.e., net radial imbalance force vector $F_i$ may be directed to an equilibrium direction, but fail to have dynamic stability, i.e., a disturbing displacement will move force vector $F_i$ away from the equilibrium direction and force vector $F_i$ will not return to the equilibrium direction upon relaxation, as explained in greater detail below.

The new theory of subterranean drill bit failure noted above, referred to as the backwards bit whirl theory, will now be described. A more complete description of the theory is provided in J. F. Brett, T. M. Warren, and S. M. Behr, "Bit Whirl: A New Theory of PDC Bit Failure," *Society of Petroleum Engineers*, (SPE) 19571, presented at the 64th Annual Technical Conference of the SPE, San Antonio, Tex., Oct. 8-11, 1989.

It has long been known, and research continues to support the proposition, that optimal penetration rates and drill bit lifetimes are achieved when the rotation of the drill bit is statically stable about the longitudinal bit axis, and when the cutting edges of the cutting elements are not chipped or broken. Although some chipping and wear of the cutting elements is unavoidable, they are quite durable under stable bit rotation conditions, and the diamond cutting edges can be regenerated to some extent with continued drilling because the carbide supports that extend beyond the cutting edge of a chipped cutter will wear faster than the diamond. Once chipping of the diamond occurs, however, the performance of the drill bit drops significantly.

Through an extensive research effort, the present inventors have discovered that cutter damage and corresponding drill bit failure apparently are caused by impact damage attributable to a subterranean drilling phenomenon termed backwards whirl. Backwards whirl is defined as a condition in which the center of rotation of the drill bit moves on the bit surface as the bit rotates. The phenomenon of backwards whirl can be explained with reference to FIGS. 9B and 9D.

FIG. 9B illustrates a condition in which drill bit 40 has been moved by net radial imbalance force $F_i$ radially on the bit to a position in which the drill bit contacts borehole wall 46 at a contact point 50 corresponding to force point N. If the net radial imbalance force vector $F_i$ becomes large enough to force the surface of the bit body against the borehole wall, and if frictional or cutting forces prevent the drill bit surface contacting the borehole wall from sliding on the borehole wall essentially without friction, contact point 50 becomes the instantaneous center of rotation for the drill bit. For example, the instantaneous center of rotation of the drill bit may move from the longitudinal bit axis toward contact point 50 at or near the gauge portion of the drill bit body. This new frictional force between the drill bit body surface and the borehole wall, which is caused or accentuated in conventional subterranean drill bits by the gauge cutters around the gauge portion of the bit, causes the instantaneous center of rotation of the bit to continue to move around the face portion of the bit, away from the longitudinal bit axis and toward the borehole wall, as the bit rotates.

When a drill bit begins to whirl, the cutting elements can move backwards, sideways, etc. They move further per revolution than those on a bit in stable rotation, and they move faster. As a result, the cutters are subjected to high impact loads when the drill bit impacts the borehole wall, which occurs several times per bit revolution for a whirling bit. These impact forces chip and break the cutters. Once backwards whirl begins, it regenerates itself.

An object of the present invention is to provide a drill bit that overcomes the problems presented by backwards whirl of a subterranean drill bit. The subterranean drill bit of the present invention overcomes the undesirable effects of backwards whirl by providing a cutting element arrangement and corresponding drill bit body profile that, during the drilling, direct the net radial imbalance force vector $F_i$ toward the bearing means and substantially maintains the force vector $F_i$ on the bearing means in a stable fashion. The bearing means thus provides a low friction bearing zone that contacts the borehole wall with relatively low friction. The cutter devoid region also minimizes frictional forces, such as those attributable to gauge cutters, from causing the drill bit to grip or dig into the borehole wall and move the instantaneous center of rotation of the drill bit.

In accordance with the invention, the cutting elements are disposed to cause the net radial imbalance force vector $F_i$ to substantially maintain the bearing means in contact with the borehole wall during the drilling, but small enough to avoid creating frictional or cutting forces that will cause the drill bit to grip or dig into the borehole wall and move the instantaneous center of rotation of the drill bit on the bit. Ideally, this condition would hold throughout the operation of the drill bit. Further in accordance with the invention the cutting elements are disposed to cause the net radial imbalance force vector $F_i$ to have an equilibrium direction. The features of the invention in which the cutting elements are disposed to cause the net radial imbalance force vector to have a magnitude and direction to substantially maintain the bearing means in contact with the borehole wall during the drilling, and to cause the net radial imbalance force vector to have an equilibrium direction, are related to the static stability of the drill bit.

Figure 10:
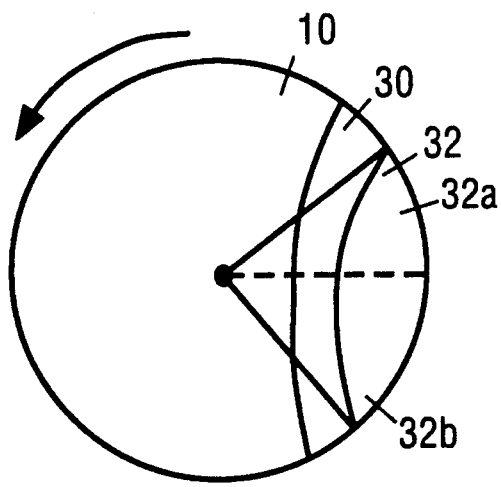
FIG. 10 shows a face or longitudinal view of the subterranean drill bit of FIGS. 1A and 1B in which the sliding surface is divided into a leading half and a trailing half.

Through study and experimentation, the present inventors have discovered that the drill bit of the present invention preferably should be designed so that force point N, for assumed steady state conditions, is located at a point in the leading portion or half of the bearing means. This relationship is illustrated by FIG. 10, which shows a leading half 32a and a trailing half 32b of sliding surface 32, with the bit rotating counterclockwise as indicated by the arrow. With this arrangement, if the drill bit encounters harder earthen materials or "hangs up" for a moment on the borehole wall, the variable force vector $F_{ci}$ will not move net radial imbalance force vector $F_i$ rearward beyond the trailing edge of sliding surface 32. Because force vector $F_{ci}$ is more variable than $F_{ri}$, the inventors have also concluded that, in the preferred embodiments, force vector $F_{ri}$ for steady state conditions is greater than force vector $F_{ci}$. This relationship enhances the static and dynamic stability of the drill bit.

The magnitude of the net radial imbalance force vector $F_i$ preferably is in the range of about 3% to 40% of the applied weight-on-bit load. For example, if the weight-on-bit load is 10,000 pounds, then $F_n$ should be within the range of 300 to 4,000 pounds. If the drill bit is designed for relatively low weight-on-bit, the magnitude of force vector $F_i$ should be relatively high, and vice versa. If the drill bit is designed for relatively high RPM, a somewhat greater magnitude of force vector $F_i$ is needed. If a relatively large drill bit is used, the magnitude of force vector $F_i$ should be decreased. Of course, the greater the magnitude of force vector $F_i$, in general, the greater will be the wear on the bearing means.

Sliding surface 30 directly contacts the borehole wall without hydrodynamic lubrication. Drilling mud is pumped through nozzles 27a and circulates up the borehole past the drill bit body, thereby providing some lubrication for sliding surface 30. This lubrication is not, however, hydrodynamic. Significant contact of the sliding surface with the borehole wall does occur. Accordingly, treatments for the sliding surface, for example, as shown in FIGS. 6A-6C, are often desirable.

The inventors have found that the drill bit of the invention can be further refined by specifically positioning the cutting elements (including selecting the drill bit body shape and design) not only to control the direction and magnitude of net radial imbalance force vector $F_i$, but also of the individual force components making up the force vector $F_i$, i.e., circumferential imbalance force vector $F_{ci}$ and radial imbalance force vector $F_{ri}$. More specifically, drill bit performance has shown improvement by positioning the face and gauge cutting elements so that at least one of force vectors $F_{ci}$ and $F_{ri}$ is directed to a location corresponding to the bearing means at all times during the operation of the bit. Additional stability can be achieved by designing the drill bit shape and positioning the face and gauge cutters so that force vectors $F_{ci}$ and $F_{ri}$ are approximately aligned with each other and with the resultant net radial imbalance force vector $F_i$.

Further in accordance with the invention, the cutting elements are disposed to cause net radial imbalance force vector $F_i$ to substantially return to the equilibrium position in response to a disturbing displacement, preferably for disturbing displacements or offsets of up to 75 thousandths of an inch. This feature of the invention is related to the dynamic stability of the drill bit.

Figure 11A:
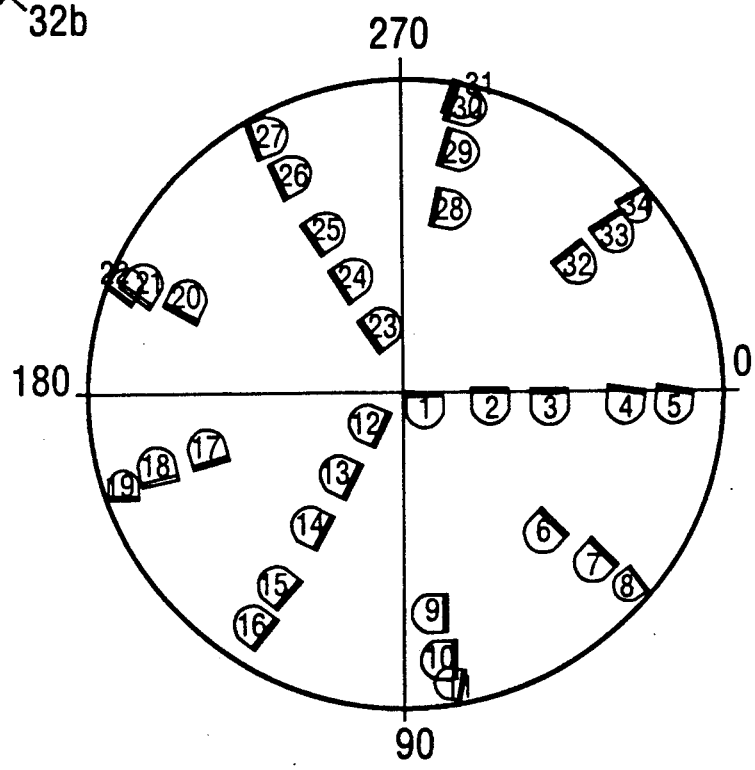
FIG. 11A shows a face or longitudinal view of a subterranean drill bit made according to a known design.
Figure 11B:
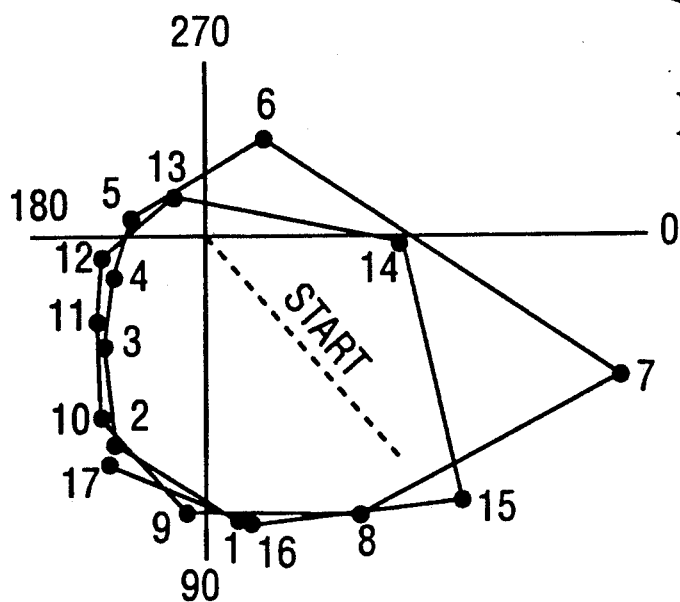
FIG. 11B shows a plot of the net radial imbalance force vector $F_i$ for the drill bit of FIG. 11A.
Figure 12A:
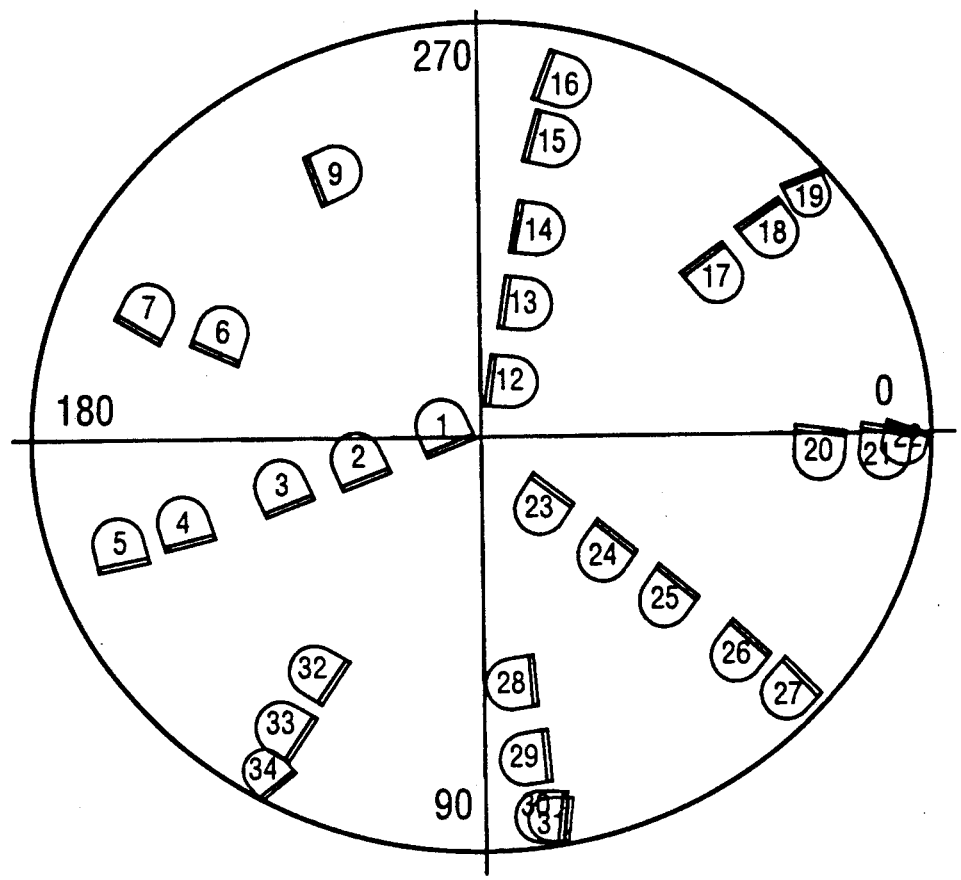
FIG. 12A shows a face or longitudinal view of a subterranean drill bit in accordance with the invention.
Figure 12B:
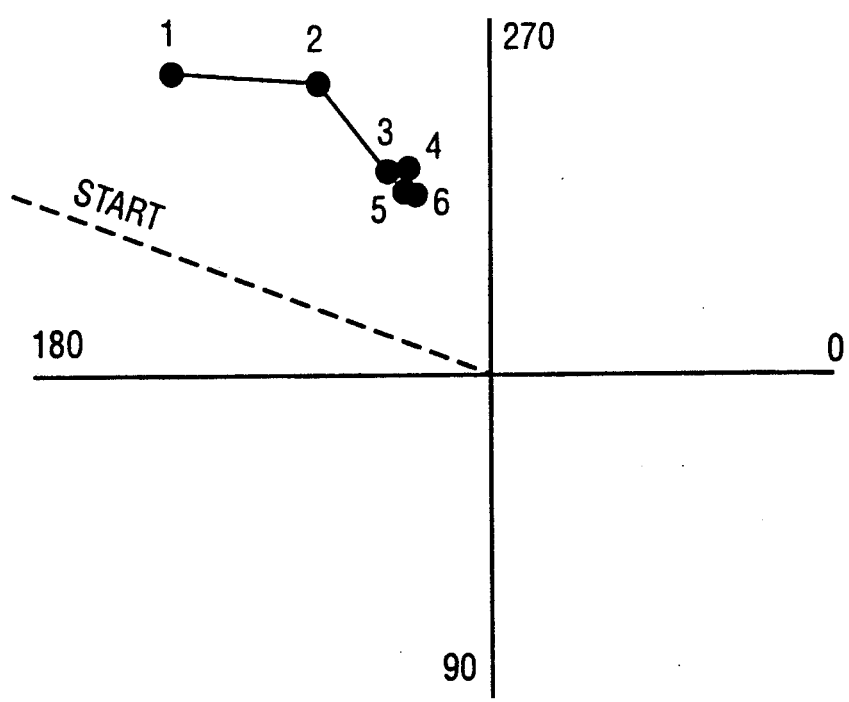
FIG. 12B shows a plot of the net radial imbalance force vector for the drill bit of FIG. 12A.

The magnitude and direction of net radial imbalance force vector $F_i$ for an operational subterranean drill bit will change as the bit operates. This movement may be caused by the factors above, such as heterogeneity of the subterranean earthen materials to be drilled. The lack of dynamic stability can cause force vector $F_i$ to move away from the bearing means in response to a disturbance, and either converge to a new equilibrium position away from the bearing means or become dynamically unstable, in which case force vector $F_i$ can continue to move as further drilling occurs. To illustrate, FIG. 11A shows a longitudinal view of a subterranean drill bit made according to a known design, and FIG. 12A shows a longitudinal view of a subterranean drill bit in which cutters 8, 10 and 11 have been removed to provide a low friction bit in accordance with the invention. Table 1 gives the offset, offset direction, imbalance force direction, net radial imbalance force direction, and net radial force imbalance magnitude for the drill bit of FIG. 11A. Table 2 shows corresponding data for the low friction bit of FIG. 12A. Offset here refers to the radial distance that the drill bit center of rotation is moved corresponding to a disturbing displacement during drilling. The offset direction refers to the radial direction of the disturbing displacement. FIGS. 11B and 12B are plots of net radial imbalance force vector $F_i$ (direction and magnitude) shown in Tables 1 and 2, respectively.

TABLE 1

NET RADIAL IMBALANCE FORCE VECTOR v. OFFSET FOR DYNAMICALLY UNSTABLE DRILL BIT

| Offset | Initial Offset Direction | Imbalance Force Direction | Imbalance Magnitude (pounds) |
|---|---|---|---|
| 0″ | 0° | 56° | 1300 |
| .030″ | 56 | 83 | 1746 |
|  | 83 | 91 | 1412 |
|  | 91 | 94 | 1302 |
|  | 94 | 87 | 1101 |
|  | 87 | 93 | 1352 |
|  | 93 | 94 | 1302 |
| .050″ | 56° | 85° | 2070 |
|  | 85 | 108 | 1600 |
|  | 108 | 126 | 946 |
|  | 126 | 149 | 607 |
|  | 149 | 192 | 453 |
|  | 192 | 292 | 630 |
|  | 292 | 22 | 2480 |
|  | 22 | 66 | 2267 |
|  | 66 | 92 | 2028 |
|  | 92 | 114 | 1459 |
|  | 114 | 134 | 857 |
|  | 134 | 164 | 542 |
|  | 164 | 231 | 428 |
|  | 231 | 352 | 968 |
|  | 352 | 48 | 2552 |
|  | 48 | 82 | 2101 |
|  | 82 | 106 | 1789 |

TABLE 2

NET RADIAL IMBALANCE FORCE VECTOR v. OFFSET FOR DYNAMICALLY STABLE DRILL BIT

| Offset | Initial Offset Direction | Imbalance Force Direction | Imbalance Magnitude (pounds) |
|---|---|---|---|
| 0″ | 0° | 204° | 1189 |
| 0.030″ | 204° | 227° | 1753 |
|  | 227 | 236 | 1405 |
|  | 236 | 235 | 1322 |
|  | 235 | 235 | 1322 |
| 0.050″ | 204° | 229 | 2111 |
|  | 229 | 244 | 1733 |
|  | 244 | 250 | 1224 |
|  | 250 | 252 | 1124 |
|  | 252 | 252 | 1031 |

The drill bit of FIG. 11A demonstrates dynamic stability at an offset displacement of 0.030 inches and an initial offset direction of 56°. The net radial imbalance force vector $F_i$ has a stable direction and magnitude. The drill bit of FIG. 11A becomes and remains unstable, however, for an offset of 0.050 inches and the same initial offset direction of 56°.

The drill bit of FIG. 12A, in contrast, remains both statically and dynamically stable for offsets of both 0.030 inches and 0.050 inches and an initial offset direction of 204°. Although the direction of net radial imbalance force vector $F_i$ changes after the disturbing displacement in each case, the direction of force vector $F_i$ is substantially toward an equilibrium direction, and still toward a location corresponding to the bearing means.

The drill bit of the first preferred embodiment provides dynamic stability by making sliding surface 32 of sufficient size to encompass the net radial imbalance force vector as the net radial imbalance force vector moves in response to changes in hardness of the subterranean earthen materials, and by positioning the cutting elements to minimize the variations in the direction of force vector $F_i$. If the sliding surface is not sufficiently large to create this condition, backwards whirling can occur. Through experimentation, the inventors have found that the sliding surface preferably should extend over at least 20%, and most preferably over 50 to 60%, of the gauge circumference. The sliding surface can extend over as much as 90% of the gauge circumference without adversely affecting the ability of the bit to sufficiently drill. As a general rule of thumb, the circumferential length of the sliding surface should correspond to the expected range of movement of force vector $F_i$, plus up to about 20% on either side of this range of movement.

If a drill bit in accordance with the present invention is operated at high rotational speed, e.g., of 500 rpm or more, the net radial imbalance force component $F_i$ will have a significant dynamic component associated with centrifugal forces. In such an embodiment, the magnitude of force vector $F_i$ can be increased by constructing the drill bit so that a portion of the cutter devoid region has a first density and portions of the drill bit body other than the cutter devoid region have a second density different from the first density. A similar result may be achieved by constructing the drill bit so that the bearing means has a first density, and portions of the drill bit body other than the bearing means have a second density different from the second density. Preferably, such a drill bit can be designed to have a greater mass on its side adjacent the bearing means, so that centrifugal forces push the bearing means against the borehole wall. The asymmetric mass distribution in a rotating body creates a force that can contribute to the net radial imbalance force.

The operation of drill bit 10 will be described below in conjunction with the method for drilling subterranean earthen materials in accordance with the invention.

Figure 13A:
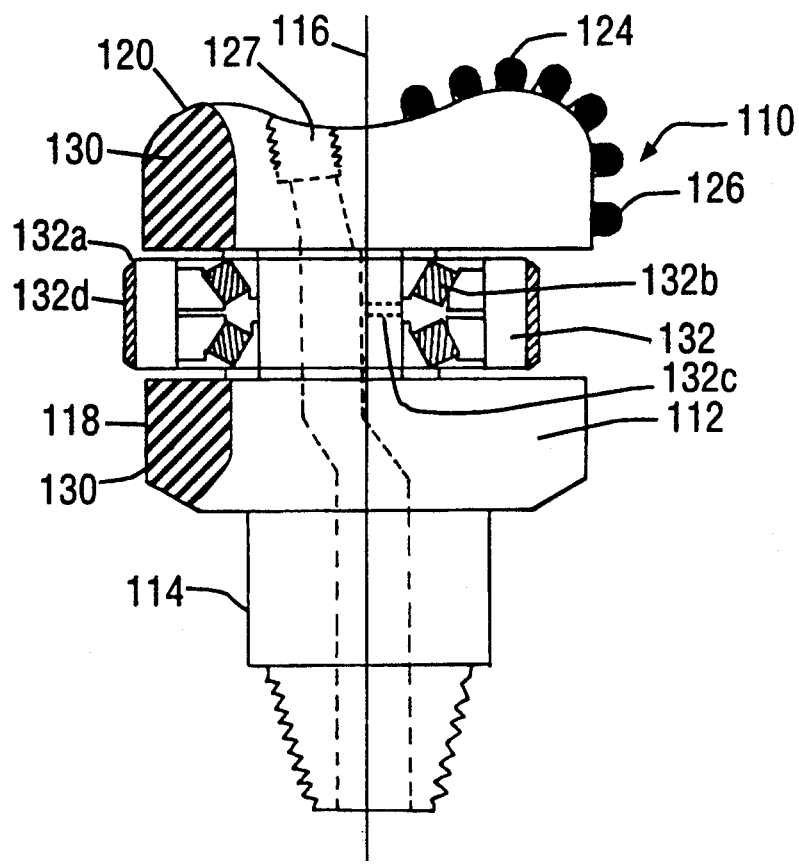
FIG. 13A shows a side view of a subterranean drill bit in accordance with the second preferred embodiment of the invention.
Figure 13B:
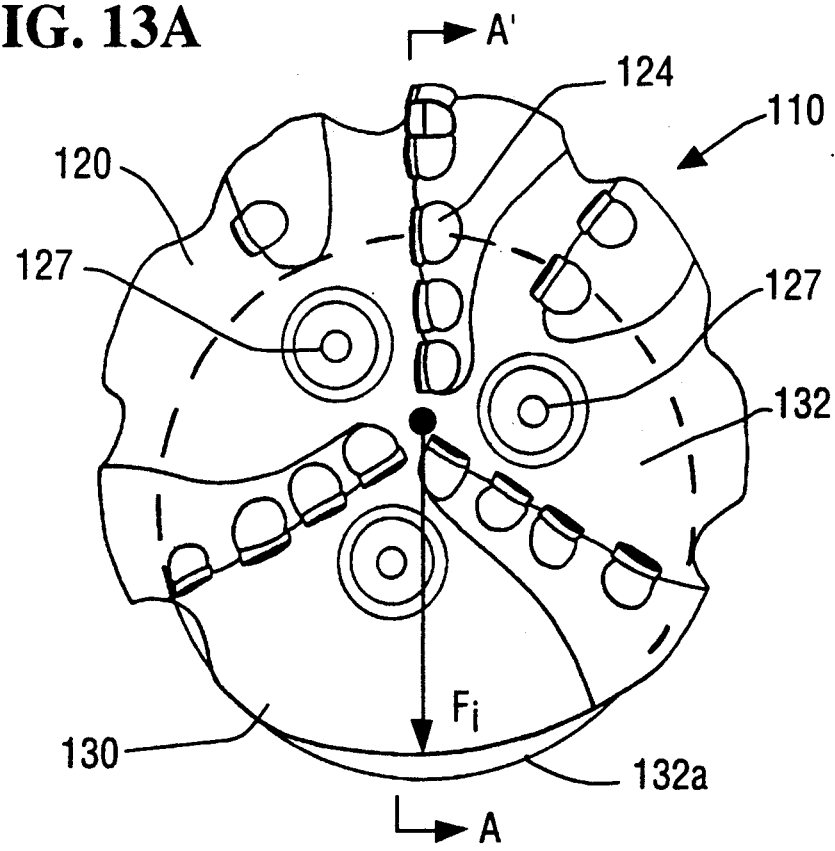
FIG. 13B shows a face or longitudinal view of the subterranean drill bit shown in FIG. 13A.

A second preferred embodiment of the invention will now be described with reference to FIGS. 13A and 13B. The subterranean drill bit of the second preferred embodiment, designated by reference numeral 110, is similar to drill bit 10 of the first preferred embodiment, but differs in that the bearing means comprises a roller assembly rather than a sliding surface. As with drill bit 10, drill bit 110 is operable with a rotational drive source (not shown) for drilling in subterranean earthen materials to create a borehole having a borehole wall. Drill bit 110 includes a drill bit body 112 having a base portion 114 disposed about a longitudinal bit axis 116 for receiving the rotational drive source. Drill bit 110 further includes a gauge portion 118 disposed about longitudinal bit axis 116 and extending from base portion 114. Drill bit body 112 further includes a face portion 120 disposed about longitudinal bit axis 116 and extending from gauge portion 118.

Drill bit 110 further includes a plurality of diamond cutting elements 124 fixedly disposed on and projecting from face portion 120 and spaced from one another, and a plurality of diamond gauge cutting elements 126, spaced from face portion cutting elements 124, fixedly disposed on and projecting from gauge portion 118 and spaced from one another. The cutting elements are disposed for creating a net radial imbalance force during the drilling along a net radial imbalance force vector $F_i$ approximately perpendicular to longitudinal bit axis 116 (FIG. 13B), as has been described above for the drill bit of the first preferred embodiment.

Drill bit 110 further includes a substantially continuous cutter devoid region 130 disposed on gauge portion 118 and on face portion 120 and intersecting a force plane P_f formed by longitudinal bit axis 116 and net radial imbalance force vector $F_i$, essentially as has been described above for drill bit 10.

Drill bit 110 further includes bearing means disposed in cutter devoid region 130 about the force plane for substantially continuously contacting the borehole wall during the drilling.

The bearing means of the second preferred embodiment comprises a roller 132 rotatably mounted within drill bit body 112 so that an edge 132a of roller 132 is disposed about the force plane and extends beyond the bit body. Roller 132 is rotatably mounted within drill bit body 112 by a bearing assembly 132b. An internal fluid conduit and nozzle arrangement 127 are provided so that the fluid conduit passes through the center of bearing arrangement 132b, thus enabling hydraulic fluids such as drilling mud to be distributed along face portion 120, for example, in a known manner. Bearing assembly 132b includes channels 132c in fluid communication with the flow channel of fluid conduit 127 for providing fluid such as drilling mud to wash, lubricate, and cool bearing assembly 132b.

Preferably, roller 132 is as large as possible within the geometric constraints of the drill bit body to accomodate the largest possible bearing assembly. Roller 132 preferably has a radius that is at least 75% of the gauge radius. Roller 132 may have a resilient or wear resistant coating material 132d with protruding studs disposed on its exterior to contact the borehole wall to ensure that the roller rotates as the drill bit rotates.

The operation of drill bit 110 will be described below in conjunction with the method for drilling subterranean earthen materials in accordance with the invention.

Having described the preferred embodiments of the invention, the preferred method for making a subterranean drill bit according to the invention will now be described. In describing the preferred method, reference will be made to the preferred embodiments of the invention described above. Reference to the preferred embodiments, however, is for clarity and ease of illustration, and is not intended to limit the method of the invention.

In accordance with the invention, a method is provided for making a subterranean drill bit operable with a rotational drive source for drilling in subterranean earthen materials to create a borehole having a bore hole wall.

The method of the invention includes selecting a simulated drill bit body having a base portion disposed about a longitudinal bit axis for receiving the rotational drive source, a gauge portion disposed about the longitudinal bit axis and extending from the base portion, and a face portion disposed about the longitudinal bit axis and extending from the gauge portion.

In accordance with the preferred method, the simulated drill bit body selecting step includes selecting a drill bit body design such as drill bit body 10 or 110. The specific drill bit body for use in the method is not limited, and a variety of drill bit body designs, including those known in the art, are useful for practicing the preferred method. The selection of a simulated drill bit body can include selecting an actual drill bit, or selecting a bit design in the abstract for purposes of simulation.

Further in accordance with the invention, the method includes selecting a simulated cutting element arrangement in which a plurality of diamond cutting elements are fixedly disposed on and project from the face portion and are spaced from one another.

The simulated cutting element arrangement selecting step of the preferred method includes selecting an arrangement of cutting elements such as cutting elements 24 of drill bit 10 or cutting elements 124 of drill bit 110, and selecting an arrangement or positioning and orientation of the cutters on the face portion of the drill bit body. In addition, the selected simulated cutting element arrangement of the preferred method may include fixedly disposing gauge cutting elements such as cutting element 26 of drill bit 10 or cutting elements 126 of drill bit 110. Several methods are available for selecting the specific simulated cutting element arrangement. For example, this step may include selecting a known or commercially available drill bit (the drill bit body selection step of the preferred method) with diamond cutting elements predisposed on the bit body. Alternatively, this step may include a theoretical selection of a cutting element arrangement, for example, in which the cutting elements are arranged according to a preexisting design, a randomly or arbitrarily selected design, or a design generated from a model or algorithm embodying a set of design criteria. Thus, the simulated cutting element arrangement selecting step may comprise selecting a known drill bit and cutter arrangement design, or generating a new design derived by the designer.

The method of the invention further includes determining a net radial imbalance force vector for the selected cutting element arrangement to obtain an equilibrium direction for the net radial imbalance force vector. The net radial imbalance force vector measuring step may include determining a circumferential imbalance force vector $F_{ci}$ and a radial imbalance force vector $F_{ri}$ for the selected simulated cutting element arrangement.

In accordance with the preferred method, the net radial imbalance force vector determining step includes using a geometric model or simulation of the cutting surfaces on a drill bit to calculate the forces acting on each of the cutting surfaces. That is, a computer model is used to simulate a drill bit and the forces acting on the bit. The computer model may correspond to the one disclosed in U.S. Pat. No. 4,815,342.

The source for the information on the drill bit design required as input for the model will depend upon the procedure adopted in the simulated drill bit body and cutting element arrangement selecting steps. For example, if these selecting steps are carried out by selecting an existing drill bit design for modification or retrofit, the input information can be obtained by taking physical measurements of the drill bit body and cutter dimensions, as described more fully below. If the simulated drill bit body and cutting element arrangement selecting steps are carried out by selecting the parameters for a subterranean drill bit design, the net radial imbalance force vector determining step may include calculating the various forces on the cutting elements of the selected cutting element arrangement. The net radial imbalance force vector determining step thus comprises calculations performed on assumed parameters.

It is assumed for purposes of explaining the preferred method that the simulated drill bit body and cutting element arrangement selecting steps are carried out by selecting an existing, commercially available subterranean drill bit. Under this assumption, the net radial imbalance force vector determining step can be carried out as follows.

Because cutting elements are pre-installed on the drill bit, their specific size, arrangement, orientation, and other related parameters can be measured physically. The measured parameters can serve as inputs to the model which effectively simulates the drill bit and the forces acting on the bit. A procedure for physically measuring the parameters of the drill bit in accordance with the preferred method will now be described.

Figure 14:
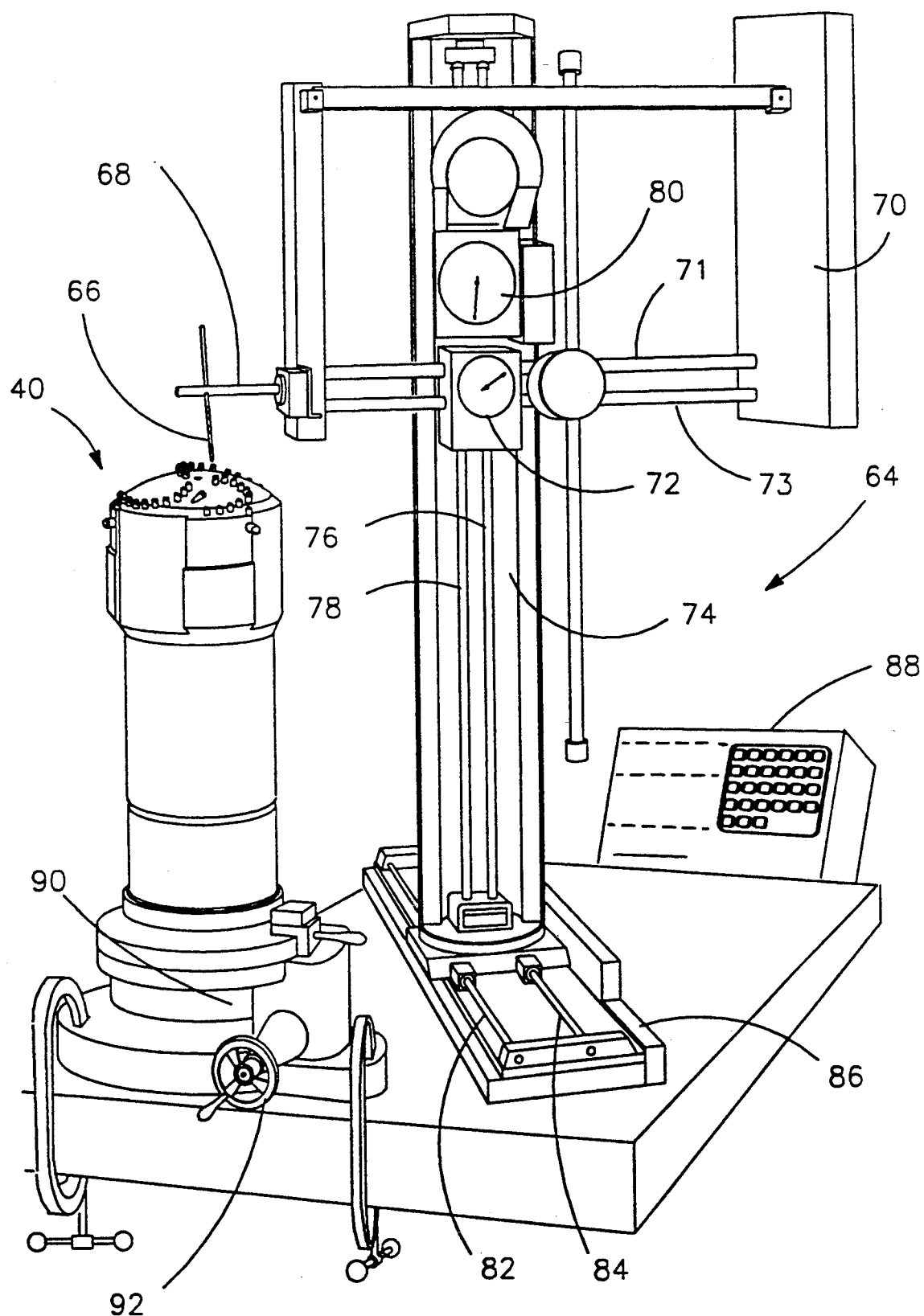
FIG. 14 shows a commercially available coordinate measuring machine for use in the preferred subterranean drill bit manufacturing method of the invention.

FIG. 14 shows a commercially available coordinate measuring machine adjacent to a subterranean drill bit 40 of known design. Coordinate measuring machine 64 includes a pointer 66 fixedly mounted on a rotatable arm 68. The lower end of pointer 66 is formed into a point which is fixed relative to arm 68. Arm 68 is mounted on a laterally slidably frame 70. Frame 70 includes parallel rods 71, 73 along the axis of which frame 70 may slide. A meter 72 indicates the lateral position of frame 70 relative to an upright base 74. Frame 70 is also vertically movable along parallel rods 76, 78 with the height of the frame being indicated by a meter 80. Parallel rods 82, 84 are mounted on a lower fixed base portion 86. Rods 82, 84 support upright base 74 for sliding movement along the axis of rods 82, 84. A meter (not visible) indicates the relative position of base 74 on rods 82, 84. Rods 82, 84 are oriented in space perpendicular to rods 76, 78 and to rods 71, 73. Likewise, rods 76, 78 and rods 71, 73 are each perpendicular to each of the other two sets of rods.

The readings on the meters indicate the relative positions of the rods used to define a point in space occupied by the pointed end of pointer 66. The position of the point on the pointer can thus be referenced to a three-dimensional coordinate system defined by rectilinear X, Y and Z axes with each meter representing a relative position along one of the axes. A digital meter 88 provides a readout of the X, Y and Z coordinates of the point on pointer 66 and also provides such coordinates, upon operator command, to the memory of a commercially available computer (not shown).

Drill bit 40 is mounted on a rotary turntable 90, the angular position of which is controlled by handle 92. An angular scale, not visible, shows the angular position of the turntable and thus of drill bit 40 which is supported the turntable with its axis aligned with the turntable axis.

In accordance with the preferred method, pointer 66 is positioned on a plurality of points on the surface of the drill bit and the coordinates of each particular point are stored in the computer. From this data, a computer model or simulation of the drill bit is constructed. In making the measurements, a first set of measurements is made around the shank or base portion of the bit so that the computer has data from which the longitudinal axis of the bit can be determined. A second set of measurements on the perimeter of each cutter face is made. In making the measurements, the angular position of rotary table 90 is noted and is associated with the three coordinates which are produced by measuring machine 64 for all measurements taken at that particular angle of the rotary table. This enables all measurements to be taken substantially normal to each measurement point and increases the accuracy of the measurement process. After the longitudinal bit axis is determined, each cutter face on the cutting elements is measured.

Figure 15A:
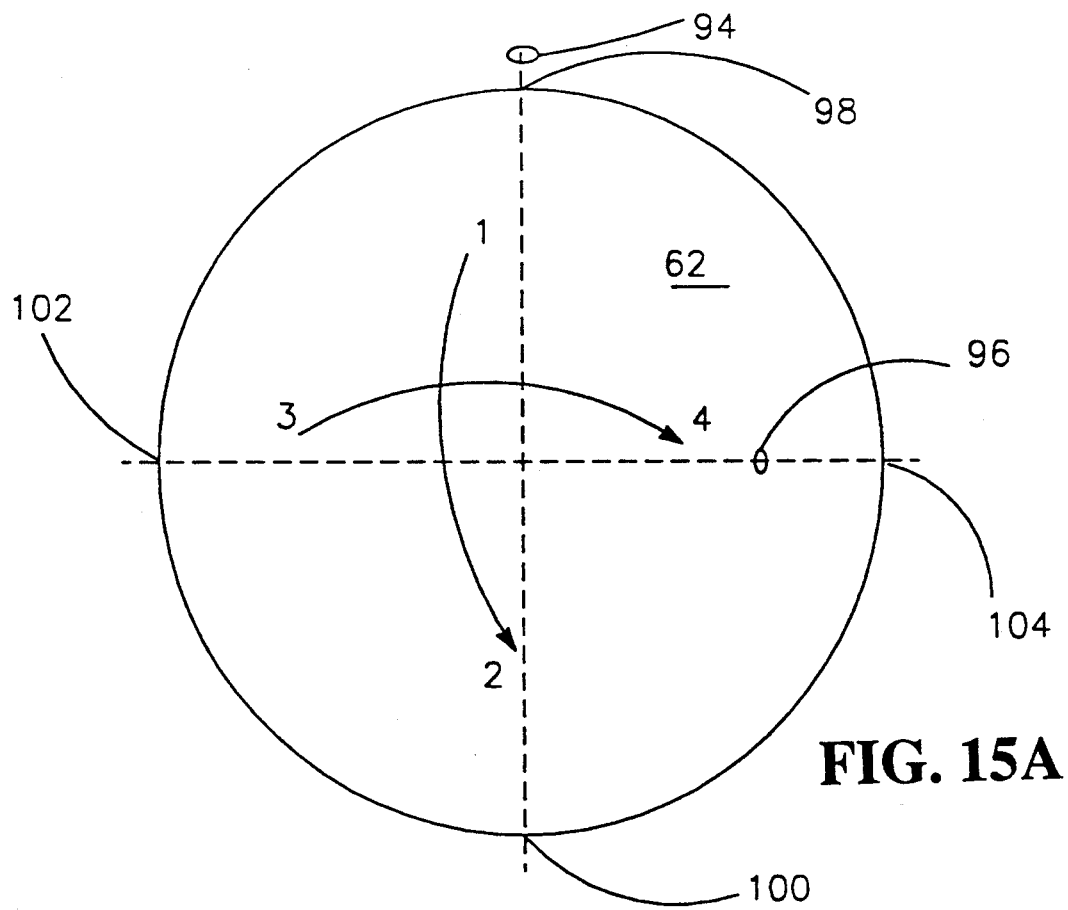
FIGS. 15A and 15B show individual cutting elements and illustrate the manner of measuring their geometry in accordance with the preferred drill bit manufacturing method of the invention.
Figure 15B:
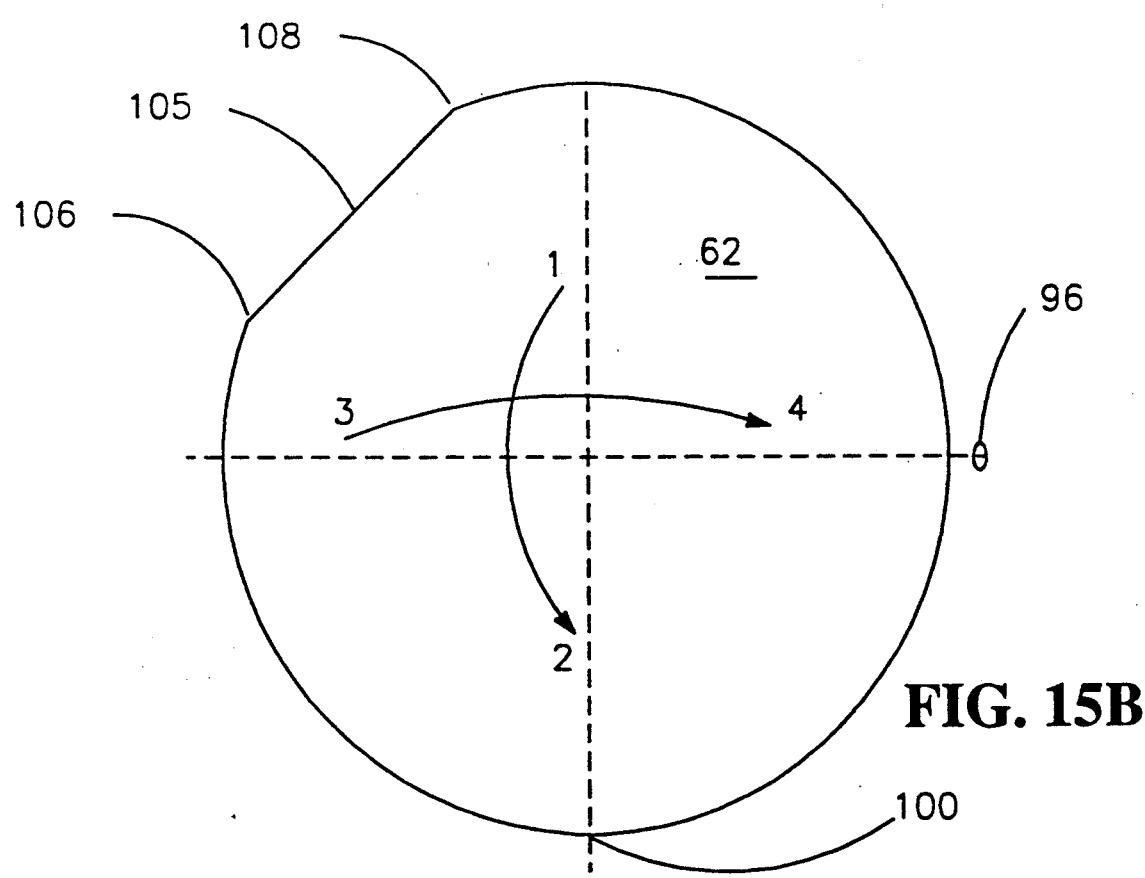

For a description of the manner in which these measurements are made, attention is directed to FIGS. 15A and 15B. Each cutter face includes a vertical axis 94 which is substantially parallel to the cutter face and extends from the uppermost portion thereof to the lowermost portion. Also included is a horizontal axis 96 which extends from the leftmost to the rightmost portions of the cutter face and is parallel thereto. In making the measurements with the coordinate measuring machine, the point on pointer 66 in FIG. 17 is first positioned at the intersection of axis 94 with the perimeter of cutter face 62, such defining a first measurement point 98. A second measurement point 100 is located at the intersection of axis 94 with the lower edge of cutter face 62. A third measurement point 102 is at the left side intersection of axis 96 with the outer perimeter of cutting face 62, while a fourth measurement point 104 is at the right side intersection of axis 96 with the perimeter of cutting surface 62.

The numbers and arrows shown in the central portion of cutting face 62 in FIGS. 15A and 15B indicate the order in which the first four measurements on each cutting face on the drill bit are taken, i.e., along the cutting face vertical axis first, and thereafter along the cutting face horizontal axis. When the point on pointer 66 is positioned first at point 98, the coordinates and angular position of the turntable are provided to the computer, and likewise for each of the other four measuring points.

FIG. 15B is a view of cutting surface 62 after the bit has been used to drill a bore, and thus includes a wear flat 105 on one side of the cutter developed as a result of the cutter being forced against the rock formation during drilling. When such irregularities occur on the perimeter of the cutting surface as in the case of FIG. 15B, fifth and sixth measurement points 106 and 108 are taken to completely define the perimeter of the cutting face.

As each measurement is put into the computer, it is associated with a number that indicates the order in which the measurement was taken. In FIG. 15A, the measurements at points 98, 100, 102 and 104 are numbered 1, 2, 3, 4, respectively, and in FIG. 15B, the measurements are similarly numbered with measurements at points 106 and 108 being additionally numbered 5 and 6, respectively. Each cutting face is measured at a single angle on the turntable which is also recorded. In addition to the foregoing, a value is recorded to indicate the general shape of the edge of the cutting face between adjacent measurements. If the shape is generally a straight line, a zero is recorded, and if the shape is generally a circular arc, a one is recorded. Thus, a number is provided to the computer memory to indicate the general shapes between each of the adjacent measuring points in FIG. 15A In FIG. 15B, a number value of one is recorded between the first and fourth measurements, between the fourth and second measurements, between the second and third measurements, between the third and fifth measurements, and between the sixth and first measurements, while a zero is recorded between the fifth and sixth measurements to indicate the substantially straight line edge formed by worn portion 105. Thus, each of the recorded measurement points defines the perimeter of a cutting surface having a fixed angular orientation relative to the longitudinal axis of the drill bit. In addition, the connectivity between each adjacent point is stored in the computer memory. The connectivity is simply an indication of the shape of the cutting face perimeter between adjacent measurements. As will later become more fully apparent, the connectivity value between adjacent measurements is used to interpolate additional coordinates using circular interpolation when the connectivity is one, and linear interpolation when the connectivity is zero.

Figure 16:
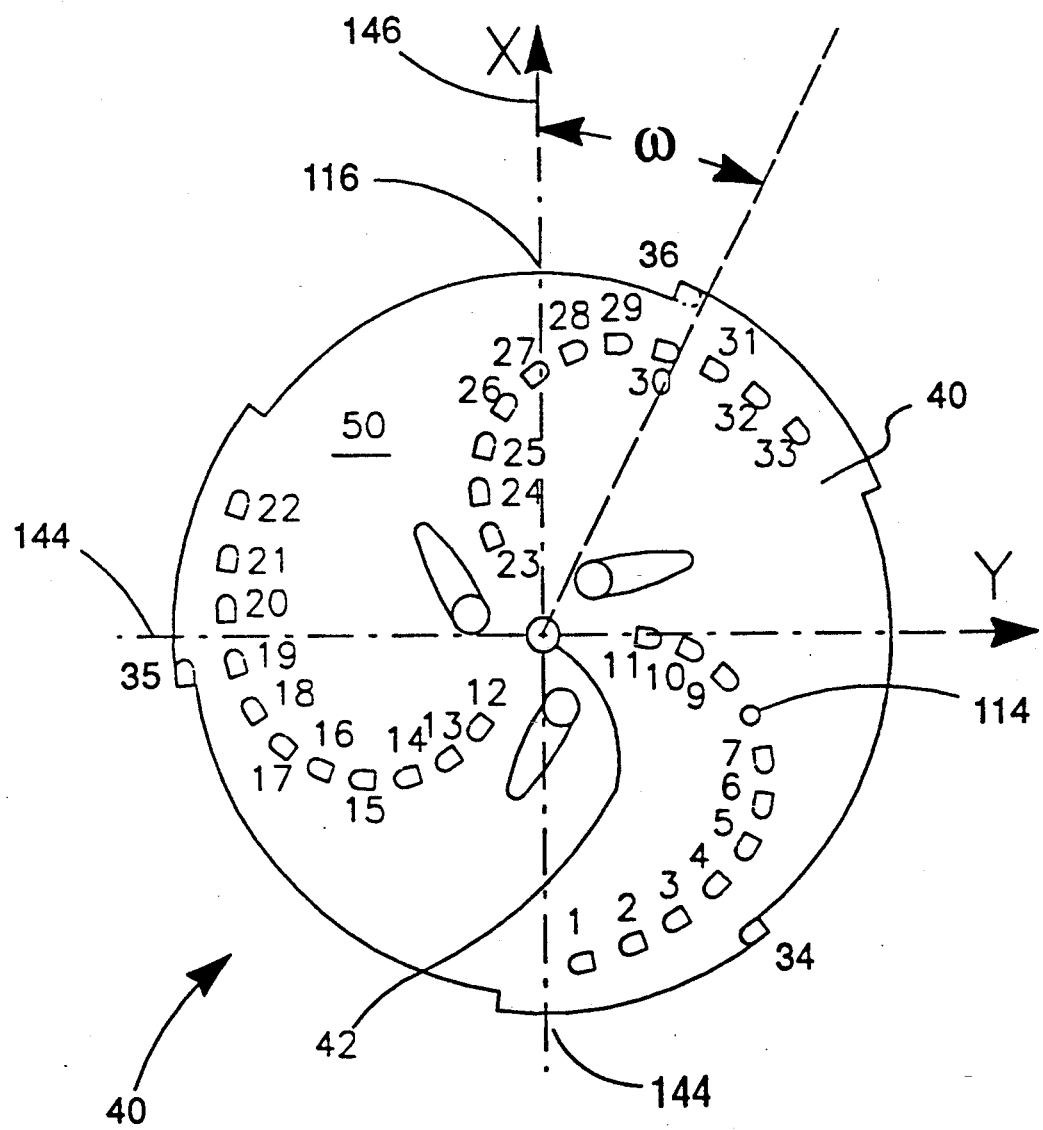
FIG. 16 shows a face or longitudinal view of a subterranean drill bit part way through the process of manufacture in accordance with the preferred drill bit manufacuting method of the invention.

Turning now to FIG. 16, drill bit 40 is shown partway through the process of manufacture. As can be seen, the cutters are all mounted on the drill bit body, except for cutter 8. A bore 114 is formed in the drill bit body to receive the stud of cutter 8. Each of the other cutters has its stud press filled into an associated bore in the drill bit body. Prior to mounting cutter 8 on the drill bit body, the dimensions of the drill bit body around the circumference thereof and the cutting faces of each of the cutters which are installed on the drill bit body are recorded and entered into a computer memory as previously described. Thus, the computer stores data relating to the circumference of the drill bit body (from which the longitudinal bit axis can be determined) and the position of each cutter face (except, of course for cutter 8 which is not yet installed) in space relative to the bit axis.

Figure 17A:
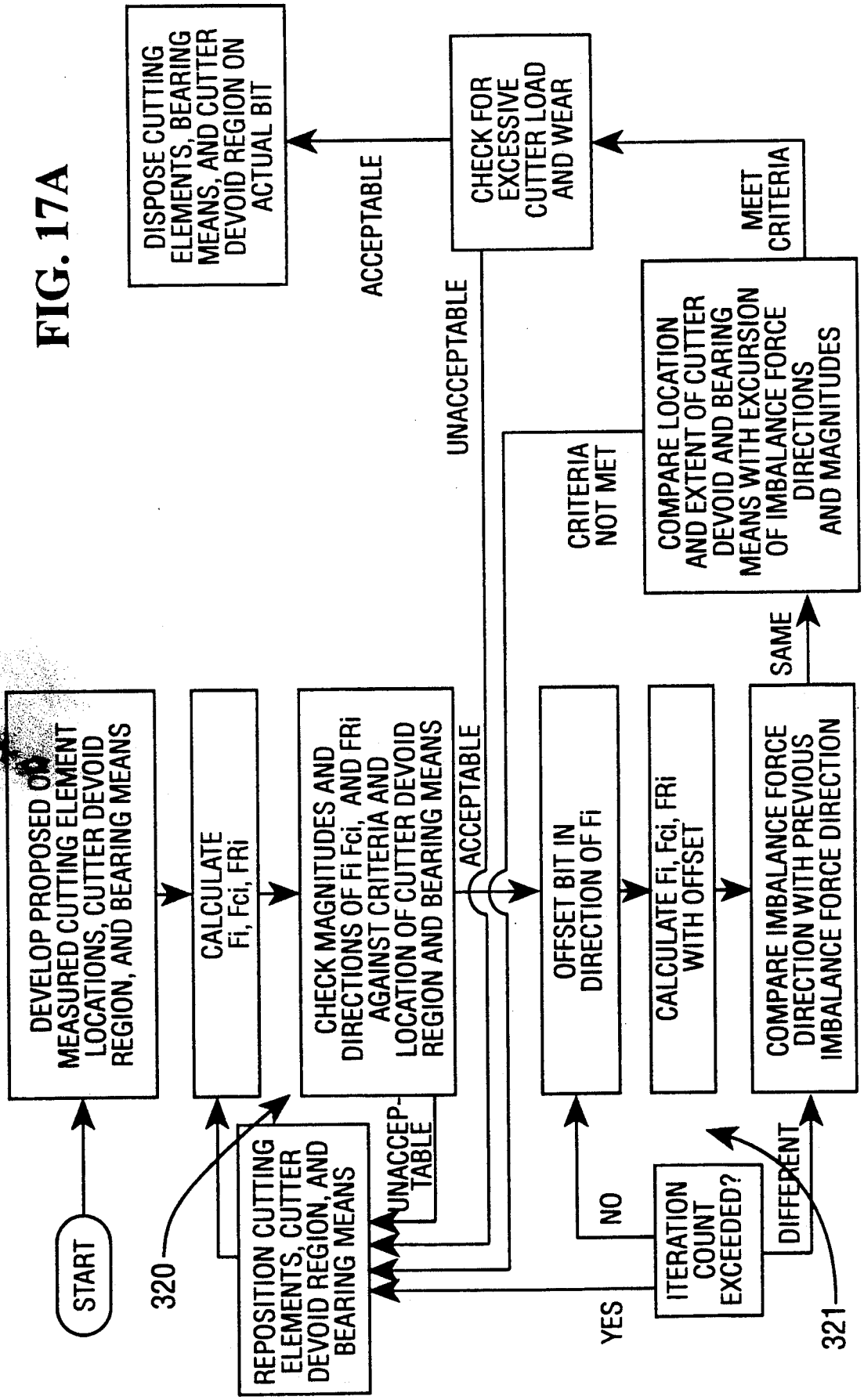
FIG. 17A shows a flow chart for illustrating the preferred manufacturing method of the invention.
Figure 17B:
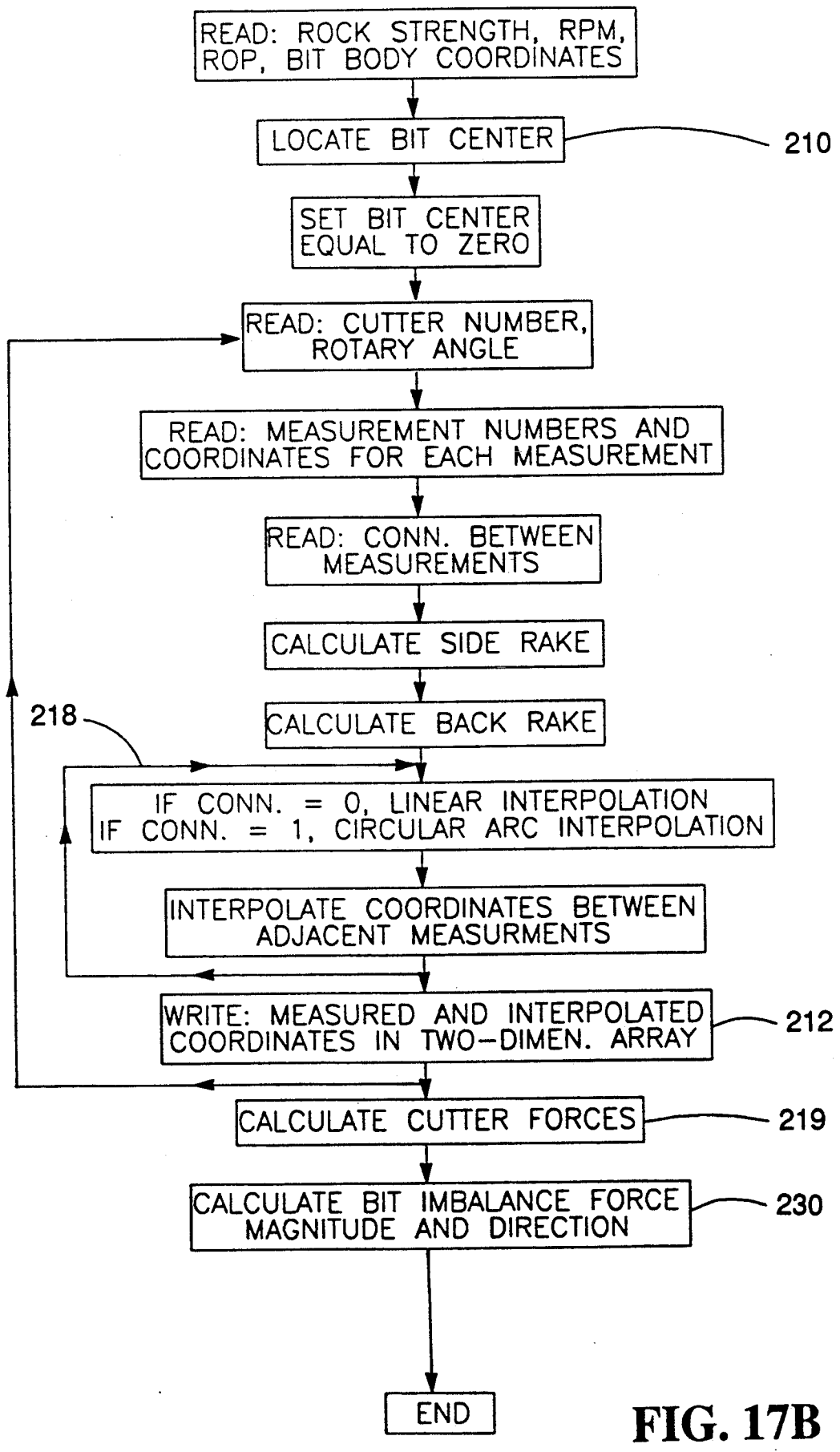
FIG. 17B shows a flowchart of a model or computer program for use with the preferred drill bit manufacturing method of the invention.

FIG. 17A shows a flow chart for illustrating the preferred manufacturing method of the invention, and FIG. 17B shows a flow chart of the model or computer program for use in connection with net radial imbalance force vector measuring step of the preferred manufacturing method. Although the entire flow chart deals with the manufacture of the drill bit, a significant portion of the computer program relates only to generating a model or simulation of a drill bit. As will later become more fully apparent, that portion of the program relating to modeling the bit begins at box 210 with the step of "Locate Bit Center" and concludes with box 212, "Write: Measured and Interpolated Coordinates in Two-Dimensional Array."

To initiate the program, data is provided relating to the strength of the rock in which the bit is to be used, the rate of revolution of the bit and the rate of penetration, i.e., the rate at which the hole is bored. Also, the bit body coordinates (those taken about the circumference of the drill bit body) are read from the computer memory.

Thereafter, the bit body coordinates are used to locate the longitudinal bit axis by means of a least squares regression. A subroutine to accomplish this task can be written by a person having ordinary skill in the art.

As will be recalled, each of the three coordinates for each point measured on the bit body are referenced to the coordinate measuring machine, rather than to the longitudinal axis of the drill bit body. After the longitudinal axis of the drill bit body is located in the coordinate system in which the measurements were taken, the coordinate system can be translated to set the vertical or Z axis to align with the bit center. Next, the data file for a particular cutter number and the rotary angle at which that data was generated is read from the computer memory. Thereafter, each measurement number, for example, one of a series of sequential numbers identifying the order in which the measurements were taken, is read with the coordinates associated with that particular measurement number. Then, the connectivity between adjacent measurements is read which, as will be recalled, defines the general shape, either straight line or generally circular arc, between adjacent measurements.

Next, the side rake of each cutter face is calculated. The side rake is defined relative to a vertical reference plane which contains axes 144, 146. The plane passes through the center of the drill bit body and divides it into equal halves. Coordinates which define the horizontal cutting face axis for a particular cutter, such being measurement points 102, 104 in FIG. 15A, are rotated about the circumference of the drill bit center along the path the coordinates would travel during actual drill bit rotation. When the center point of the cutter face intersects the vertical reference plane, the angle between axis 96, the horizontal axis, and the vertical reference plane defines the side rake. It can be seen that the coordinates located at the center point of each cutter surface can be easily calculated since the same is defined by the intersection of axes 94, 96, the position of which are known.

In a similar fashion, back rake is defined as the angle between reference plane 116 and vertical axis 94 after the coordinates defining the horizontal and vertical axes are rotated until the intersection thereof intersects the reference plane. In other words, to calculate both side rake and back rake, the coordinates defining the cutter face are first rotated until the intersection of axes 94, 96 is received in the vertical reference plane. Thereafter, the angles between horizontal axis 96 and the reference plane (side rake) and vertical axis 94 and the reference plane (back rake) are measured. It is to be appreciated that a subroutine capable of rotating the coordinates and measuring angles as above described could be easily written by a person having ordinary skill in the art.

Figure 18A:
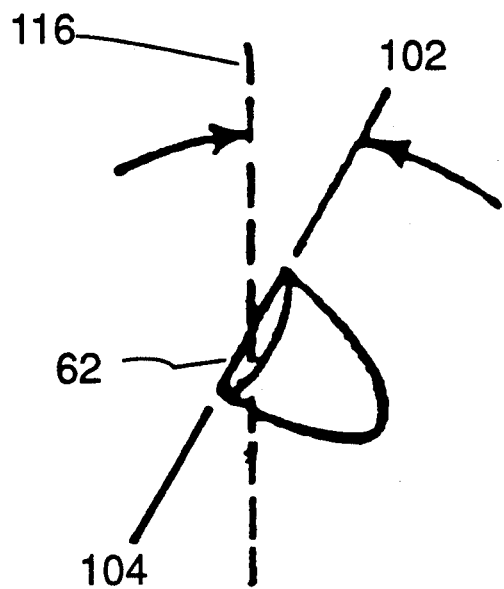
FIG. 18A is a view of a cutting element for illustrating the siderake of the cutting element.

By way of example, FIG. 18A is a face or longitudinal view of the drill bit body showing a vertical reference plane 116 which contains the longitudinal bit axis and axis 146. A cutter surface 62, representative of one of the cutter surfaces on drill bit 40, has been rotated until the center of the cutter intersects plane 116 as shown. It can be seen that since surface 62 is parallel to the longitudinal axis of the drill bit body, there is zero degrees back rake. Thus, the angle shown in FIG. 18A is the side rake.

Figure 18B:
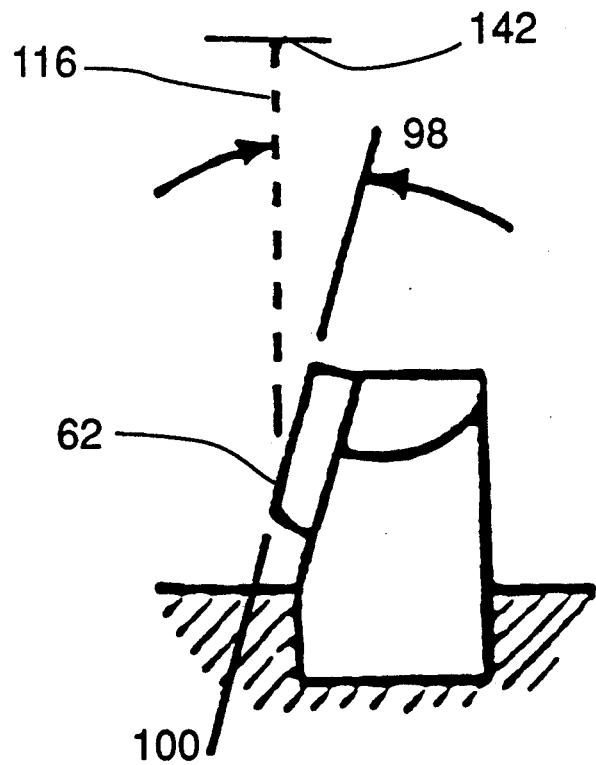
FIG. 18B is a view of a cutting element for illustrating the backrake of the cutting element.

FIG. 18B is a view of a cutter surface reviewed from the side of the drill bit. Cutter surface 62 has been rotated until the center of the same intersects plane 116. Surface 62 in FIG. 18B has zero degrees side rake since the surface is parallel with axis 142 and the angle shown in back rake.

It is to be appreciated that in most cases, cutter surfaces include both slight amounts of back rake and side rake. The views of FIGS. 18A and 18B are for the purposes of illustrating the manner in which back rake and side rake are measured.

Turning again to the flow chart of FIG. 17B, after calculation of side and back rakes for a particular cutter surface, the program selects a measurement point on the circumference of the cutter surface and checks the connectivity between that point and the next clockwise measurement point. If the connectivity is zero, a linear interpolation is run between the adjacent coordinates to establish a series of coordinates along a straight line between the adjacent measured points. The program continues to the next clockwise measuring point, checks the connectivity between the adjacent points and if equal to one, generates a series of coordinates by circular arc interpolation between the adjacent points. The program continues in clockwise fashion about the cutter surface until a plurality of coordinates are produced by interpolation between adjacent measuring points which define the perimeter of the cutter surface. A loop 218 continues until coordinates have been interpolated between all measuring points thus defining the cutter face perimeter.

Figure 19A:
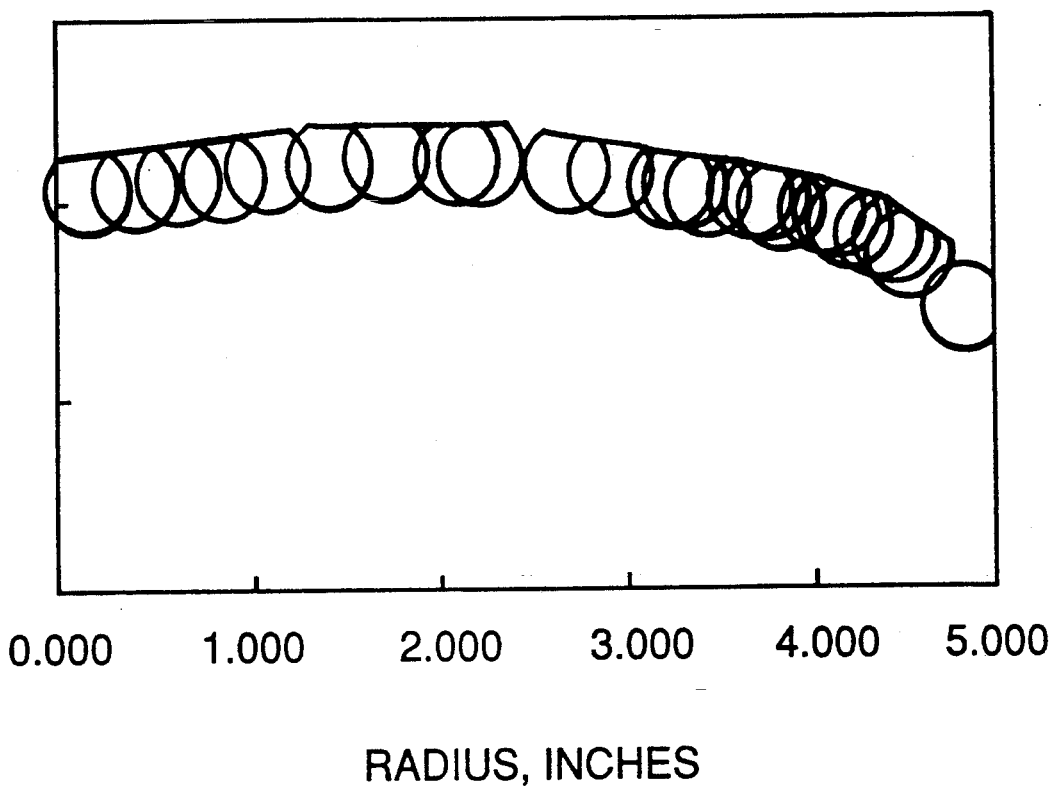
FIG. 19A is a plot of all of the cutters on the drill bit of FIG. 16 rotated into a reference plane.

Next, the program projects both the measured and interpolated coordinates into reference plane 116. Thus, each coordinate in the projected cutter face profile can be designated by two numerals, and the measured and interpolated coordinates which define the perimeter of the cutter face are stored in a two-dimensional array. By way of example, attention as directed to FIG. 19A which is a plot of each of the cutter faces on drill bit 40 in FIG. 16 projected into reference plane 116. With the vertical axis corresponding to the longitudinal drill bit body axis, each coordinate in the perimeter of a cutter face profile can be designated by a distance along a radial axis and a distance above the reference plane. For example, on the horizontal axis, zero is at the center of the bit body and 4.25 inches is at the circumference of the bit body since the drill bit in this example is an 8.5 inch bit.

Figure 19B:
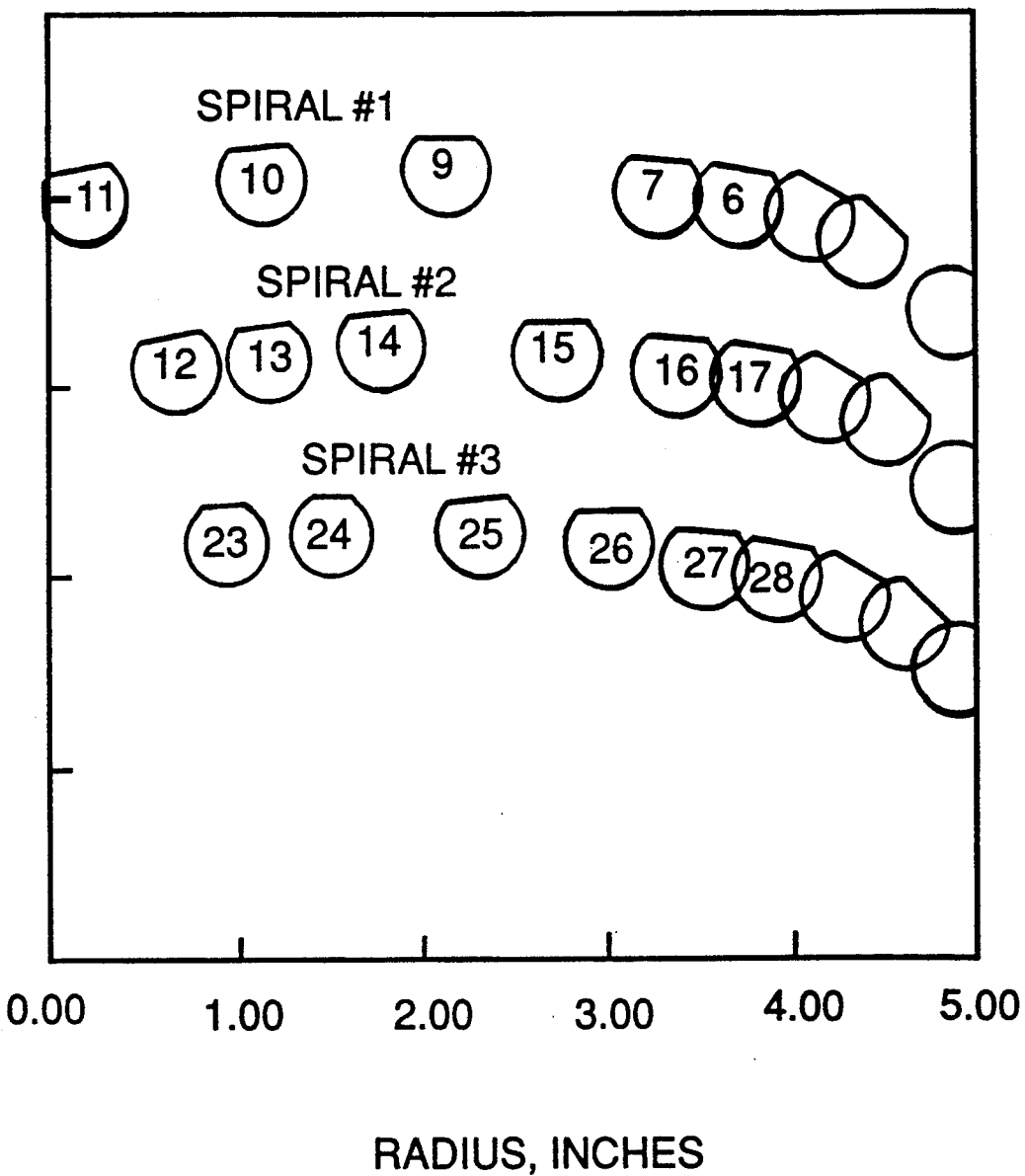
FIG. 19B is a plot similar to FIG. 19A, with the cutters of each spiral separated to more clearly illustrate their positioning.

In order to more clearly identify the cutter surfaces in each of the three spirals, a projection onto the reference plane for each spiral is shown in FIG. 19B. It can be seen in spiral number 1 that there is no profile for cutter 8 since the same has not yet been installed.

Returning attention again to the flow chart of FIG. 17B, after each of the cutter faces in cutters 1–7 and 9–36 have been represented in a two-dimensional array as described above, the program proceeds to box 219, and the step of calculating the forces acting on each cutter is undertaken. Considering now FIGS. 20A and 20B, generally speaking, the forces acting on an individual one of the cutters on the drill bit can be defined as a normal or penetrating force, such being designated $F_n$ in FIGS. 20A and 20B, and a cutting force such being the vector $F_c$ in FIG. 20A. The normal force is the force required to cause the cutter to penetrate into the rock, and is given by the formula:

$$F_n = \frac{\cos(\alpha - EBR)}{1 - \sin(\alpha - EBR)} \cdot d_w \cdot B_f \cdot RS \cdot d_{ce} \cdot C_1 + A_w \cdot RS \cdot C_2$$

In the above formula, alpha ($\alpha$) is the friction angle of the rock. EBR is the effective back rake, which is a function of the real back rake and real side rake (both of which were discussed previously) and the angle at which $F_n$ acts.

Figure 20C:
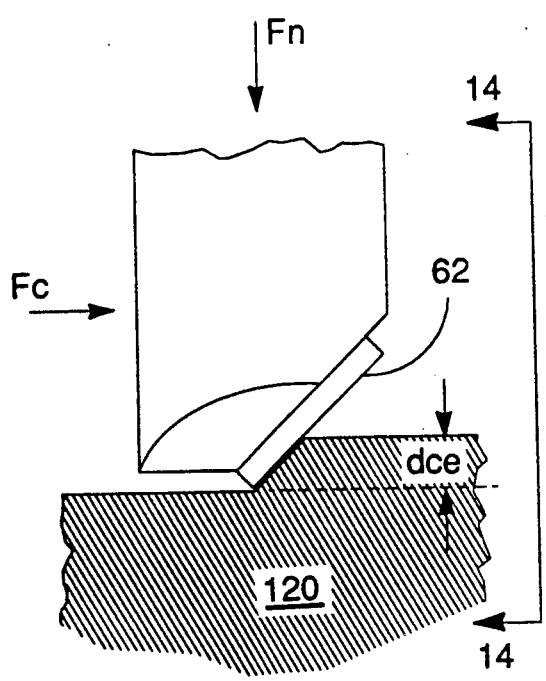
Figure 20C:
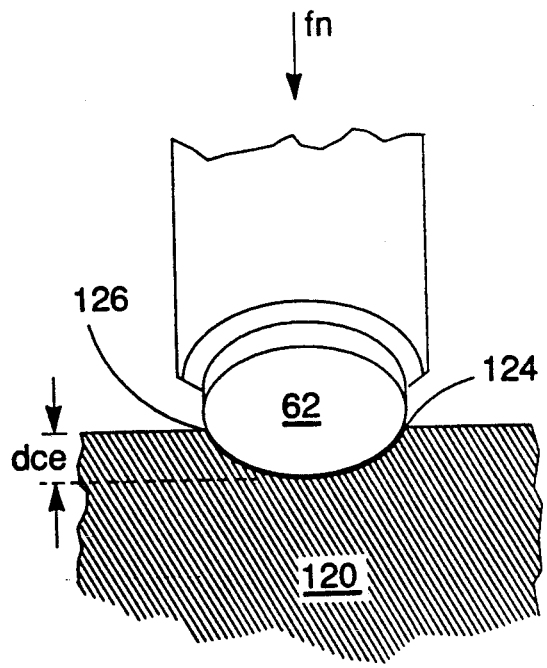
Figure 20C:
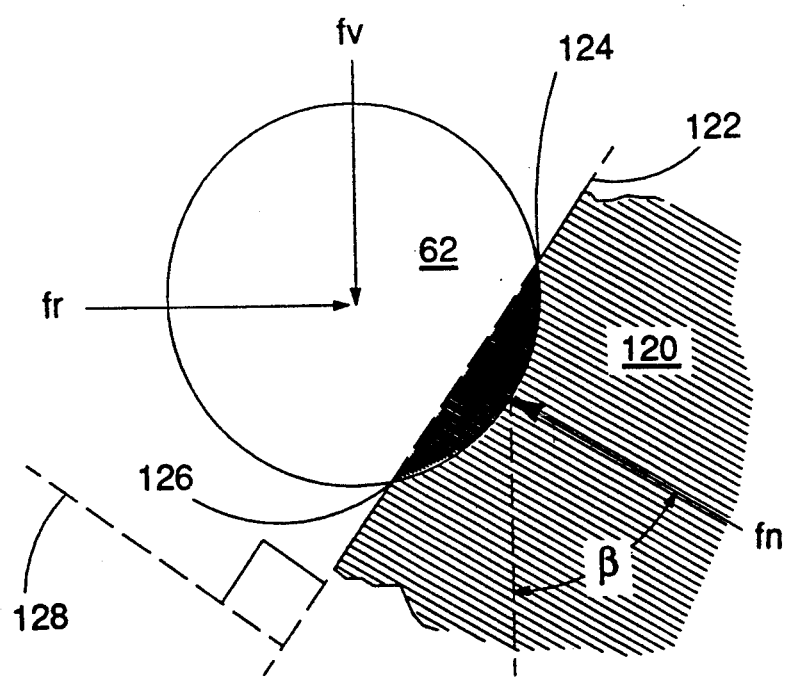

Referring to FIG. 20C, cutting surface 62 is schematically illustrated embedded in a rock formation 120. Although not shown in FIG. 20C, most of the other cutting surfaces on the drill bit body are embedded to one extent or another in formation 120. The effective back rake (EBR) may be thought of as the angle between cutting face 62 of the cutter and a cutting plane 122. Cutting plane 122 is parallel to an axis formed between points 124 and 126 on the cutting face and is perpendicular to vector $F_n$. Points 124 and 126 are the points at which the surface of formation 120 intersects cutting face 62. In other words, the shaded area on face 62 defines the cross-section of the cut in formation 120 being made by cutting face 62.

Plane 122 is further oriented in that a perpendicular axis 128 to plane 122 passes through the longitudinal axis of the bore being drilled. Of course, when there is no wobble of the drill bit during drilling, the longitudinal axis of the bore and the drill bit are coincident.

In summary, the effective back rake is the angle between cutting face 62 and cutting plane 122 as shown in FIG. 20C. The effective back rake can be computed when the real side and back rakes are known, which will be recalled, were calculated by the program and when the position of cutting plane 122 is known. The position of cutting plane 122 is dependent upon the depth of the cut which, in turn, is dependent upon the rate of penetration and bit revolution. As will be recalled, these values are input to the program as preselected parameters indicative of the drilling conditions under which the bit will be used.

$B_f$ is the bit factor, a variable which ranges between about 0.75 and about 1.22, and which, in accordance with the preferred method, is selected to account for slight differences between simulations on the computer model of bit wear for a given drill bit and real drill bit wear occurring under actual conditions. The bit factor $B_f$ accounts for unexplained effects for a particular bit. A value of this factor greater than 1.0 indicates that the bit drills slower than expected, and a value less than 1.0 indicates that the bit drills faster than expected. A person having ordinary skill in the art can empirically determine the value of $B_f$ for a selected drill bit.

The width of cut made by the cutter is designated $d_w$. In accordance with the preferred method, the computer model generates a grid of parallel vertical lines across each cutter face and $d_w$ is equal to the width between adjacent lines. The equation is then calculated for each grid o generate a total force for the utter.

The effective depth of cut is designated $d_{ce}$ and $C_1$ is a dimensionless constant which, in accordance with the preferred method, is equal to 1,100. The manner in which $C_1$ is determined will be shortly described, and $d_{ce}$ can vary slightly from the actual depth of cut. The manner of selecting the value of $d_{ce}$ is known to persons having ordinary skill in the art.

Considering now the second term of the equation for $F_n$, $A_w$ is the wear flat area, RS is again a constant related to the strength of the rock formation, and $C_2$ is a constant equal to 2,150.

The first component in the equation for $F_n$ is equal to the amount of force required to prevent the cutter face from riding up out of the cut for a selected cutting depth and width. The second component of the equation for $F_n$ includes a factor for a dull cutter which has a wear flat of area $A_w$ formed thereon. This portion of the normal force is that required to compress the rock beneath a dull cutter to enable it to penetrate the rock. $C_1$ and $C_2$ can be empirically determined by first using a new bit, thus setting $A_w$ to zero, and therefore causing the entire second term to go to zero. A known normal force can be applied and with each of the other factors known, $C_1$ can be determined. Thereafter, the value of $C_1$, 1,100 in the preferred method, is inserted into the equation and the bit is used until wear flats appear. Thereafter, wear flat area is measured and inserted into the equation, and the equation is then solved for $C_2$, which in the preferred method equals 2150.

The circumferential cutter force $F_c$ is the force required to advance the cutter along the cut after the normal force embeds the same in the formation. An arrow depicting the orientation of $F_c$ is also shown in FIG. 20A. The circumferential cutter force is dependent upon the sliding friction between the cutter and rock and the force required to fracture the rock. The following equation can be used to calculate the circumferential cutter force:

$$F_c = \frac{\sin(\alpha - BR)}{1 - \sin(\alpha - BR)} \cdot C_3 \cdot RS \cdot d_w + C_4 \cdot F_N$$

The first term of the circumferential cutter force equation is the cutting force, i.e., that required to fracture the rock, and the second term is the nonproductive friction carried on a cutter wear flat. The variables in the equation are as described above and, in addition, $d_{cm}$ is the mean depth of cut. In the preferred method, the dimensionless constants $C_3$ and $C_4$ are equal to 3,000 and 0.3, respectively. $C_3$ and $C_4$ can be determined empirically by drilling with two known circumferential forces applied to the drill bit, inserting all the known variables into the circumferential cutting force equation at each value of circumferential force, and solving both equations for $C_3$ and $C_4$.

In the example under consideration, i.e., drill bit 40 in FIG. 16, the value of the circumferential and normal forces, as illustrated in FIG. 20A, at each cutter are calculated. As noted above, the depth of cut as a function of the rate of penetration and the bit rotation rate are both provided to the computer as preselected values. Because the cutters on the drill bit can cut on a surface that is inclined to the vertical by an angle beta ($\beta$), illustrated in FIG. 20C, the normal force can be resolved into a vertical and radial component, and the circumferential force can be resolved into radial components and a moment about the bit center. The radial component of the normal force, identified as $F_r$ in FIG. 20C, is equal to $F_n \cdot \sin(\beta)$.

The components of the normal force and the circumferential force which act on the bit in the plane normal to the bit rotational axis can be resolved into a single force acting on the bit center and a single couple, both lying in the normal plane. The couple is the torque required to rotate the bit and the force is the radial imbalance force, i.e., that force which tends to push the bit against the side of the bore.

It is helpful in computing the magnitude and direction of the imbalance force to resolve the cutter forces into components along the X and Y directions, as referenced in FIG. 16. As mentioned, these axes are arbitrarily chosen but are fixed relative to any particular identifying feature on the bit. The vertical penetrating force $F_v$ has no component in these directions. The radial penetrating force $F_r$ of the normal force $F_n$ can be resolved into components along the X and Y axes by the following equations:

$$F_{xr} = F_r \cdot \cos(\omega)$$

$$F_{yr} = F_r \cdot \sin(\omega)$$

Because the circumferential force acts at right angles to the radial force for each cutter, it can be resolved into components in the X and Y directions with the following equations:

$$F_{xc} = F_c \cdot \cos(\omega - 90)$$

$$F_{yc} = F_c \cdot \sin(\omega - 90)$$

It is to be appreciated that at each cutter, there is no radial component of $F_c$. However, when the value of $F_c$ at each cutter is resolved into components along the X and Y axes in FIG. 16 with those vectors being summed, there can be a total radial component of the circumferential force. The total X and Y components of the imbalance force is then obtained by summing the components from the individual cutters as follows:

$$F_{xt} = F_{xr} + F_{xc}$$

$$F_{yt} = F_{yr} + F_{yc}$$

In some cases, the cutters may be oriented with sufficient side rake to give rise to a third source of radial force. In such cases, a radial force component attributable to side rake for each cutter is included in a manner similar to that discussed above.

After such summing, the magnitude of the radial imbalance force is given by:

$$F_i = \sqrt{F_{xt}^2 + F_{yt}^2}$$

Returning again to the flow chart of FIG. 17B, it can be seen that the step identified in box 130 is performed by resolving the cutter forces in a plane perpendicular to the drill bit axis into a single net radial imbalance force $F_i$ as described above. The value (magnitude and direction) of the force vector represents an equilibrium value. In a similar manner, a moment that tends to tilt the drill bit in a plane parallel to the central axis is calculated.

Further in accordance with the invention, the method for making a subterranean drill bit includes disposing a simulated substantially continuous cutter devoid region on the gauge portion and on the face portion and intersecting a force plane formed by the longitudinal bit axis and the net radial imbalance force vector.

As applied to the preferred method, the simulated cutter devoid region disposing step includes disposing on the drill bit body a simulated substantially continuous cutter devoid region essentially as described above for cutter devoid regions 30 and 130 for the preferred embodiments.

Further in accordance with the invention, the method includes disposing a simulated bearing support in the cutter devoid region about the force plane for substantially continuously contacting the borehole wall during the drilling.

As applied to the preferred method, the simulated bearing support disposing step includes disposing a bearing support, i.e., bearing means, such as sliding surface 32 (FIGS. 1A and 1B) or roller 132 (FIGS. 13A and 13B) or their equivalents in the cutter devoid region about force plane $P_f$ for contacting the borehole wall essentially as described above with regard to the preferred embodiments.

Further in accordance with the invention, the method includes determining a location of the net radial imbalance force vector for a preselected range of disturbing displacements of the drill bit body.

As applied to the preferred method, the step of measuring the net radial imbalance force vector for disturbing displacements includes displacing the center of rotation of the drill bit body towards some direction other than the equilibrium direction of the net radial imbalance force vector which was obtained, and calculating the value of the net radial imbalance force vector dynamically as the drill bit responds to the disturbing force during a relaxation period. The disturbing force preferably comprises an impulse force with respect to time rather than an exaggerated or prolonged application of the disturbing force. The disturbing force will cause the center of rotation of the drill bit to be displaced by an offset, an instantaneous measure of the distance between the drill bit center of rotation relative to the initial drill bit center of rotation when the net radial imbalance force vector was initially in its equilibrium direction. Measurement of the location of the net radial imbalance force vector over time for a preselected set of disturbing displacements of the drill bit body will produce data such as that appearing in Tables 1 and 2 and FIGS. 11B and 12B. In accordance with the preferred method, the disturbing displacements range up to about 75 thousandths of an inch. The method may include, for example, determining the response of the drill bit to a range of disturbing displacements taken for 2 offset magnitudes and 8 directions of 45° spacing.

Further in accordance with the invention, the method includes modifying the previously selected simulated cutting element arrangement as necessary so that the modified simulated cutting element arrangement causes the net radial imbalance force to substantially maintain the bearing support in contact with the borehole wall during the drilling, and causes the net radial imbalance force vector to return substantially to the equilibrium position in response to the disturbing displacements.

As applied to the preferred method, the simulated cutting element arrangement modifying step may be carried out using the model and computer program described above with reference to FIGS. 17A and 17B. The entire flow chart in FIG. 17B is included in the step identified as "Calculate $F_i$, $F_{ci}$, and $F_{ri}$" shown in FIG. 17A. The inventors have found that the process outlined in FIG. 17A, and further described below, allows a bit that is resistant to backwards whirl to be designed and built.

The previously described steps of the preferred method result in the development of proposed (from a hypothetical or simulated bit) or actual (from a measured bit) cutting element, cutter devoid region, and bearing means locations. The procedure outlined in FIG. 17B is then used to calculate the directions and magnitudes of the imbalance forces $F_i$, $F_{ci}$, and $F_{ri}$. The next step in the process, shown in loop 320 of FIG. 17A, involves rearranging the cutting elements so that the magnitudes and directions of the force(s), and bearing means and cutter devoid region locations are acceptable in light of the criteria herein described. If the force(s) direction and location of the bearing means and cutter devoid region are not acceptable, then the cutting elements and/or bearing means and cutter devoid region are repositioned to make a more acceptable design, and the direction and magnitude of the forces are recalculated.

Once loop 320 has been successfully completed, a second loop 321 is entered to insure that the bit is dynamically stable as defined herein. The "iteration count" shown in FIG. 17A is set high enough to insure that no good bits are rejected but low enough that the computational time is not needlessly wasted. Normally an iteration count of 20 would be acceptable. Also, the imbalance force directions are considered to be the same if previous and new directions are within about ten (10) degrees. If the design proves to be unstable, the cutting elements, bearing means, or cutter devoid region locations are repositioned to obtain a more stable design, and loop 320 is re-entered.

If loop 321 is successfully exited, then the extent and location of the cutter devoid region and bearing means are compared with the excursions of the imbalance force directions to insure that the criteria herein described are met. If the criteria are not met, the cutting element locations, bearing means, and cutter devoid region are repositioned to produce a more acceptable bit design, and loop 320 is re-entered.

If the criteria for the extent and location of the cutter devoid region and bearing means are compared with the excursions of the imbalance force directions to insure that the criteria are met, then the cutting element loads are checked for excessive wear or load by means well known to those skilled in the art. If the loads and/or wear rate are deemed to be unacceptable, then the cutting element locations, bearing means, and cutter devoid region are repositioned to produce a more acceptable bit design, and loop 320 is re-entered. Otherwise, the cutting element, bearing means, and cutter devoid region locations are used as the basis to dispose the same on an actual bit.

It is also sometimes beneficial to check the dynamic stability of a bit offset in many directions (e.g., every 45 degrees) around the face portion to insure stability and to check the proper location of the cutter devoid region and the bearing means in the event of disturbing displacements. This step is not shown in FIG. 17A, but if the bit proves to be dynamically unstable when displaced small amounts (e.g., 0.100") around the face, then it is advisable to reposition the cutters to obtain a more dynamically stable bit.

By way of example, consider an actual bit as shown in FIG. 16. In this example, there is only one cutter, cutter 8, remaining to be mounted on the drill bit body. An iterative process can be used to calculate the position for cutter 8 which directs the net radial imbalance force vector towards the bearing zone. First, it can be seen that the cutter can be radially positioned about the longitudinal axis of the cutter stud within bore 114, and further can be installed at depths which vary from completely seated, i.e., with the stud being received abutted against the lower end of the bore, to some position thereabove. Initially, an arbitrary back and side rake and vertical position of the cutting face, within preselected ranges, is assigned to cutter 8, and the program to model the drill bit and calculate cutting forces is rerun with cutter 8 in the assigned position. The program is repeatedly re-run with the face of cutter 8 being repositioned in a direction which tends to increase and properly direct the imbalance force. The program ultimately produces a set of coordinates which identify a position for the cutting face of cutter 8.

The drill bit manufacturing method of the invention further includes disposing a plurality of cutting elements, a cutter devoid region, and a bearing support on a drill bit body in accordance with the modified simulated cutting element arrangement, the simulated cutter devoid region, and the simulated bearing support.

In accordance with the preferred method, this cutting element disposing step includes physically disposing cutting elements, a cutter devoid region, and a bearing support on the drill bit body in accordance with the corresponding simulated configurations as determined above. In the example under consideration, all cutters except cutter 8 have been physically attached to the drill bit body. In this step of the preferred method, cutter 8 is positioned and fixedly attached to the drill bit body in accordance with the positioning calculated as described above.

As a follow-up measure, both the net radial imbalance force vector measuring step and the net radial imbalance force vector measuring step for a disturbing displacement can be repeated to confirm the validity of the design as determined above in accordance with the preferred method. Calculated values include the volume of cut (volume removed in one revolution) and the velocity of each cutter. Wear flat area is calculated in a known manner for 5.0 hours drilling. Percent imbalance is the imbalance force expressed as a percentage of weight-on-bit, which is the total of vector $F_{yt}$ for each cutter.

It should be appreciated that the method described above is not restricted to simply positioning a cutter within a pre-drilled bore. For example, the method can be carried out by selecting the position for the bores in the drill bit body of one or more cutters after a preselected number of cutters are installed, described above and the program can be run to determine the net radial imbalance force $F_i$. An iterative process similar to that described above can be used to position two or more remaining cutters within predrilled bores, as in the example under consideration. The program can also be used to determine the position of bores to be drilled.

Moreover, the method is not necessarily limited to cutters of the type having studs extending therefrom which are received in bores in a drill bit body. The method, including the computer program, can be used to position cutters which are directly affixed to a drill bit body by brazing or other known techniques.

Further, the method can easily be used to modify an existing drill bit to include the defined bearing support in a proper location. This modification can be accomplished by determining the direction of the net radial imbalance force vector, as described above, and then eliminating cutters on an area toward which the net radial imbalance force vector is directed. The removed cutters can be replaced with a bearing support such as those described above A number of such iterative steps may need to be taken to ensure that the quantity of net radial imbalance force vector $F_i$ is acceptable and is directed in the proper location. Such iterative steps can include replacement, removal, and rearranging of cutters to achieve the desired results.

Although the discussion above is directed to modification or retrofit of an existing drill bit design and include physical modification of a drill bit already in existence, the method is not necessarily limited in this manner. The method is carried out by simulating the drill bit body and cutter arrangement design as noted above, by calculating the optimum drill bit body design and cutting element arrangement such as through an iterative process, and manufacturing a subterranean drill bit using the results of the simulation. This "grass roots" approach can be used in conjunction with a computer program such as the one described above in relation to the preferred method of manufacture.

The method of drilling in subterranean earthen materials will now be described. The method is useful for drilling in subterranean earthen materials to create a borehole having a borehole wall.

The drilling method of the invention include connecting a subterranean drill bit to a rotational drive source, such as the rotational drive sources described above. The subterranean drill bit of this method includes a drill bit body having a base portion disposed about a longitudinal axis for receiving the rotational drive source, a gauge portion disposed about the longitudinal bit axis and extending from the base portion, and a face portion disposed about the longitudinal bit axis and extending from the gauge portion. The drill bit of the drilling method further includes a plurality of diamond cutting elements fixedly disposed on and projecting from the face portion and spaced from one another. The cutting elements are disposed for creating a net radial imbalance force during the drilling along a net radial imbalance force vector substantially perpendicular to the longitudinal bit axis. The drill bit of the drilling method further includes a substantially continuous cutter devoid region disposed on the gauge portion and on the face portion and intersecting a force plane formed by the longitudinal bit axis and the net radial imbalance force vector. The drill bit of the drilling method still further includes a bearing support disposed in the cutter devoid region about the force plane for substantially continuously contacting the borehole wall during the drilling.

In accordance with the preferred drilling method, the drill bit providing step includes providing a drill bit such as drill bit 10 or 110 as described above with regard to the first and second preferred embodiment of the invention. The cutting elements and cutter devoid region of the drill bit useful for practicing the preferred drilling method may correspond to the cutting elements and cutter devoid region described above with regard to the first and second preferred embodiments of the invention. The cutting elements of the drill bit useful in the preferred drilling method may be disposed on the drill bit to control one or both of the circumferential imbalance force vector $F_{ci}$ and the radial imbalance force vector $F_{ri}$. The bearing support for the drill bit of the preferred drilling method may comprise a sliding surface such as sliding surface 32 of drill bit 10, a roller such as roller 132 of drill bit 110, or their equivalents.

Further in accordance with the invention, the drilling method includes rotating and lowering the drill bit into the borehole to contact the subterranean earthen materials so that the net radial imbalance force vector $F_i$ substantially maintains the bearing support in contact with the borehole wall during the drilling, the net radial imbalance force vector has an equilibrium direction, and the net radial imbalance force vector returns substantially to the equilibrium direction in response to a disturbing displacement.

As applied to the preferred drilling method, the rotating and lowering step may comprise rotating and lowering drill bit 10 or drill bit 110 into the borehole to contact and drill the subterranean earthen materials.

Drill bit 10 of the first preferred embodiment can be used to drill in accordance with the preferred drilling method in the following manner. Drill bit 10 can be connected to a rotational drive source such as those described above, and can be rotated and lowered into a borehole. In this drilling operation, the inventors have discovered that a particular sequence of operations provides most beneficial results. Once the drill bit is downhole, the drill bit is first rotated at a low rotating speed, for example, 30 rpm. Then, the weight-on-bit load applied to the bit is slowly increased to approximately one half of the operating load. The rotational speed of the bit is increased to the operating speed, (typically 120 rpm), and then the full load is gradually applied to the bit. The reverse of this sequence is followed when the drilling has stopped. This sequence has been found to increase the durability and life of the drill bit.

Upon contacting the borehole bottom and beginning to drill, the net radial imbalance force vector $F_i$ will have a non-zero magnitude and a direction corresponding to an equilibrium direction. This equilibrium direction of force vector $F_i$ corresponds to the positioning of the cutting elements on the drill bit body as described above. The equilibrium direction can be calculated, for example, in the manner described above. In drilling through relatively homogeneous subterranean earthen materials, the arrangement and positioning of the cutting elements will cause the net radial imbalance force vector $F_i$ to move sliding surface 32 into contact with the borehole wall. As the drill bit is rotated, sliding surface 32 will contact and slide against the borehole wall with relatively low friction. Because sliding surface 32 and cutter devoid region 30 contain no cutting elements or abrasive surfaces, the drill bit body slides on the borehole wall and thereby avoids initiating any backwards whirling. The drill bit rotates about a substantially fixed center of rotation on the drill bit body, and thereby experiences static stability.

Upon experiencing a disturbing displacement, the instantaneous center of rotation of the drill bit will change. The cutting elements of drill bit 10 are positioned so that the changes in the forces brought about by this disturbing displacement return net radial imbalance force vector $F_i$ substantially to the initial equilibrium direction. In this manner, the drill bit remains dynamically stable.

Drill bit 110 of the second preferred embodiment can be used to drill in accordance with the preferred drilling method in the following manner. Drill bit 110 can be connected to a rotational drive source such as those described above, and can be rotated and lowered into a borehole. Once the drill bit is downhole, the drill bit is rotated and lowered according to the sequence described above.

Upon contacting the borehole bottom and beginning to drill, the net radial imbalance force vector $F_i$ will have a non-zero magnitude and a direction corresponding to an equilibrium direction. This equilibrium direction of force vector $F_i$ corresponds to the positioning of the cutting elements on the drill bit body as described above. The equilibrium direction can be calculated, for example, in the manner described above. In drilling through relatively homogeneous subterranean earthen materials, the arrangement and positioning of the cutting elements will cause the net radial imbalance force vector $F_i$ to move roller 132 into contact with the borehole wall. As the drill bit is rotated, roller 132 will roll against the borehole wall with relatively low friction. Because roller 132 and cutter devoid region 130 contain no cutting elements or abrasive surfaces, the drill bit body does not grip the borehole wall and thereby avoids initiating any backwards whirling. The drill bit rotates about a substantially fixed center of rotation on the drill bit body, and thereby experiences static stability.

Upon experiencing a disturbing displacement, the instantaneous center of rotation of the drill bit will change. The cutting elements of drill bit 110 are positioned so that the changes in the forces brought about by this disturbing displacement return net radial imbalance force vector $F_i$ substantially to the initial equilibrium direction. In this manner, the drill bit remains dynamically stable.

Having described the preferred embodiments and methods, additional advantages and modifications will readily occur to those skilled in the art. For example, the principals of the invention are applicable to subterranean drill bits in the form of core drilling bits and similar devices. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A subterranean drill bit operable with a rotational drive source for drilling in subterranean earthen materials to create a borehole having a borehole wall, the drill bit comprising:

a drill bit body having,
   a base portion disposed about a longitudinal bit axis for receiving the rotational drive source,
   a gauge portion disposed about the longitudinal bit axis and extending from the base portion, and
   a face portion disposed about the longitudinal bit axis and extending from the gauge portion;

a plurality of diamond cutting elements fixedly disposed on and projecting from the face portion and spaced from one another, the cutting elements being disposed for creating a net radial imbalance force during the drilling along a net radial imbalance force vector substantially perpendicular to the longitudinal bit axis;

a substantially continuous cutter devoid region disposed on the gauge portion and on the face portion and intersecting a force plane formed by the longitudinal bit axis and the net radial imbalance force vector; and bearing means disposed in the cutter devoid region about the force plane for substantially continuously contacting the borehole wall during the drilling;

the cutting elements being disposed to cause the net radial imbalance force to substantially maintain the bearing means in contact with the borehole wall during the drilling, to cause the net radial imbalance force vector to have an equilibrium direction, and to cause the net radial imbalance force vector to return substantially to the equilibrium direction in response to a disturbing displacement.

2. A subterranean drill bit of claim 1, further including a plurality of diamond cutting elements, spaced from the face portion cutting elements, fixedly disposed on and projecting from the gauge portion and spaced from one another.

3. A subterranean drill bit of claim 1 wherein the cutting elements are positioned in a nonlinear pattern along a radial dimension on the face portion.

4. A subterranean drill bit of claim 1 wherein the cutting elements are positioned in a nonuniform pattern on the face portion.

5. A subterranean drill bit of claim 1 wherein the rotational drive source rotates and places an axial load on the drill bit, and the net radial imbalance force vector has a magnitude within a range of 3% to 40% of the axial load.

6. A subterranean drill bit of claim 1 wherein the gauge portion has a gauge circumference relative to the longitudinal bit axis, and the cutter devoid region extends along about 20% to 70% of the gauge circumference.

7. A subterranean drill bit of claim 1 wherein the bearing means includes a leading portion, and the cutting elements are positioned to direct the net radial imbalance force vector to a location corresponding to the leading portion during the drilling.

8. A subterranean drill bit of claim 1 wherein the bearing means comprises a substantially smooth wear-resistant sliding surface disposed in the cutter devoid region about the force plane for slidably contacting the borehole wall during the drilling.

9. A subterranean drill bit of claim 8 wherein the sliding surface contacts the borehole wall without hydrodynamic lubrication.

10. A subterranean drill bit of claim 8 wherein the sliding surface includes a wear resistant coating.

11. A subterranean drill bit of claim 8 wherein the sliding surface comprises a diamond impregnated material.

12. A subterranean drill bit of claim 8 wherein the sliding surface has a size sufficient to encompass the net radial imbalance force vector as the net radial imbalance force vector moves in response to a change in hardness of the subterranean earthen materials.

13. A subterranean drill bit of claim 8 wherein the gauge portion has a gauge circumference relative to the longitudinal bit axis, and the sliding surface extends continuously along at least 20% of the gauge circumference.

14. A subterranean drill bit of claim 8 wherein the gauge portion has a gauge radius relative to the longitudinal bit axis, and a portion of the sliding surface is closer to the longitudinal bit axis than the gauge radius.

15. A subterranean drill bit of claim 8 wherein the gauge portion has a gauge radius relative to the longitudinal bit axis, and a portion of the sliding surface is farther from the longitudinal bit axis than the gauge radius.

16. A subterranean drill bit of claim 8 wherein the sliding surface has a first density and portions of the drill bit body other than the sliding surface have a second density different from the first density.

17. A subterranean drill bit of claim 8 wherein the sliding surface comprises a plurality of spaced sliding surface zones.

18. A subterranean drill bit of claim 1 wherein the bearing means comprises a roller rotatably mounted within the drill bit body so that an edge of the roller extends beyond the drill bit body.

19. A subterranean drill bit of claim 18 wherein the gauge portion has a gauge radius relative to the longitudinal bit axis, and the roller has a radius that is at least 75% of the gauge radius.

20. A subterranean drill bit operable with a rotational drive source for drilling in subterranean earthen materials to create a borehole having a borehole wall, the drill bit comprising:
a drill bit body having,
a base portion disposed about a longitudinal bit axis for receiving the rotational drive source,
a gauge portion disposed about the longitudinal bit axis and extending from the base portion, and
a face portion disposed about the longitudinal bit axis and extending from the gauge portion;
a plurality of diamond cutting elements fixedly disposed on and projecting from the face portion and spaced from one another, the cutting elements being disposed for creating a net radial imbalance force during the drilling along a net radial imbalance force vector substantially perpendicular to the longitudinal bit axis, the net radial imbalance force vector corresponding to a combination of a circumferential imbalance force vector and a radial imbalance force vector;
a substantially continuous cutter devoid region disposed on the gauge portion and on the face portion and intersecting a force plane formed by the longitudinal bit axis and the net radial imbalance force vector; and
bearing means disposed in the cutter devoid region about the plane for substantially continuously contacting the borehole wall during the drilling;
the cutting elements being disposed to cause the net radial imbalance force to substantially maintain the bearing means in contact with the borehole wall during the drilling, to cause the net radial imbalance force vector to have an equilibrium direction, and to cause the net radial imbalance force vector to return substantially to the equilibrium direction in response to a disturbing displacement.

21. A subterranean drill bit of claim 20 wherein the cutting elements are positioned to direct the circumferential imbalance force vector to a location corresponding to the bearing means.

22. A subterranean drill bit of claim 20 wherein the cutting elements are positioned to direct the radial imbalance force vector to a location corresponding to the bearing means.

23. A subterranean drill bit of claim 20 wherein the cutting elements are positioned to direct the circumferential imbalance force vector and the radial imbalance force vector to a position corresponding to the bearing means.

24. A subterranean drill bit of claim 20 wherein the cutting elements are positioned to cause the circumferential imbalance force vector to have a magnitude that is less than a magnitude of the radial imbalance force vector.

25. A method of drilling in subterranean earthen materials to create a borehole having a borehole wall, the method comprising:
(a) connecting a subterranean drill bit to a rotational drive source, the drill bit comprising,
a drill bit body having a base portion disposed about a longitudinal bit axis for receiving the rotational drive source, a gauge portion disposed about the longitudinal bit axis and extending from the base portion, and a face portion disposed about the longitudinal bit axis and extending from the gauge portion,
a plurality of diamond cutting elements fixedly disposed on and projecting from the face portion and spaced from one another, the cutting elements being disposed for creating a net radial imbalance force during the drilling along a net radial imbalance force vector substantially perpendicular to the longitudinal bit axis,
a substantially continuous cutter devoid region disposed on the gauge portion and on the face portion and intersecting a force plane formed by the longitudinal bit axis and the net radial imbalance force vector, and
a bearing support disposed in the cutter devoid region about the force plane for substantially continuously contacting the borehole wall during the drilling; and
(b) rotating and lowering the drill bit into the borehole to contact the subterranean earthen materials so that the net radial imbalance force vector substantially maintains the bearing support in contact with the borehole wall during the drilling, the net radial imbalance force vector has an equilibrium direction, and the net radial imbalance force vector returns substantially to the equilibrium direction in response to a disturbing displacement.

26. A method of drilling in subterranean earthen materials to create a borehole having a borehole wall, the method comprising:

(a) connecting a subterranean drill bit to a rotational drive source, the drill bit comprising, a drill bit body having a base portion disposed about a longitudinal bit axis for receiving the rotational drive source, a gauge portion disposed about the longitudinal bit axis and extending from the base portion, and a face portion disposed about the longitudinal bit axis and extending from the gauge portion, a plurality of diamond cutting elements fixedly disposed on and projecting from the face portion and spaced from one another, the cutting elements being disposed for creating a net radial imbalance force during the drilling along a net radial imbalance force vector approximately perpendicular to the longitudinal bit axis, the net radial imbalance force vector corresponding to a combination of a circumferential imbalance force vector and a radial imbalance force vector, a substantially continuous cutter devoid region disposed on the gauge portion and on the face portion and intersecting a force plane formed by the longitudinal bit axis and the net radial imbalance force vector, and a bearing support disposed in the cutter devoid region about the force plane for substantially continuously contacting the borehole wall during the drilling;

(b) rotating and lowering the drill bit into the borehole to contact the subterranean earthen materials so that the net radial imbalance force substantially maintains the bearing support in contact with the borehole wall during the drilling, the net radial imbalance force vector has an equilibrium direction, and the net radial imbalance force vector returns substantially to the equilibrium direction in response to a disturbing displacement.

* * * * *

UNITED STATES PATENT AND TRADEMARK OFFICE
CERTIFICATE OF CORRECTION

PATENT NO. : 5,131,478
DATED : July 21, 1992
INVENTOR(S) : J. Ford Brett, et al

It is certified that error appears in the above-indentified patent and that said Letters Patent is hereby corrected as shown below:

Col. 8, line 30, "In a with the invention" should read --In accordance with the invention--

Col. 26, line 25, "grid o generate" should read --grid to generate--

Signed and Sealed this

Fifth Day of October, 1993

*Attest:*

BRUCE LEHMAN

*Attesting Officer*         Commissioner of Patents and Trademarks